US011137106B2

(12) United States Patent
Aharon

(10) Patent No.: US 11,137,106 B2
(45) Date of Patent: Oct. 5, 2021

(54) STABILIZATION SYSTEM

(71) Applicant: DUKE AIRBORNE SYSTEMS LTD, Tirat Carmel (IL)

(72) Inventor: Sagiv Aharon, Haifa (IL)

(73) Assignee: DUKE AIRBORNE SYSTEMS LTD, Tirat Carmel (IL)

(*) Notice: Subject to any disclaimer, the term of this patent is extended or adjusted under 35 U.S.C. 154(b) by 0 days.

(21) Appl. No.: 16/604,923

(22) PCT Filed: Mar. 26, 2018

(86) PCT No.: PCT/IL2018/050344
§ 371 (c)(1),
(2) Date: Oct. 11, 2019

(87) PCT Pub. No.: WO2018/198108
PCT Pub. Date: Nov. 1, 2018

(65) Prior Publication Data
US 2020/0072407 A1 Mar. 5, 2020

(30) Foreign Application Priority Data
Apr. 25, 2017 (IL) .......................................... 251922

(51) Int. Cl.
*F16M 11/12* (2006.01)
*F16M 11/18* (2006.01)
(Continued)

(52) U.S. Cl.
CPC ............. *F16M 11/12* (2013.01); *F16M 11/10* (2013.01); *F16M 11/18* (2013.01);
(Continued)

(58) Field of Classification Search
CPC ........ G03B 17/56; F16M 11/04; F16M 11/12; F16M 11/10; F16M 11/18
(Continued)

(56) References Cited

U.S. PATENT DOCUMENTS 9,675,382 B2 * 6/2017 Bordeaux ............ A61B 17/6466
2003/0168295 A1 * 9/2003 Han ........................ F16F 15/005
188/267.1
(Continued)

FOREIGN PATENT DOCUMENTS

CN 102692201 A 9/2012
CN 103029120 A 4/2013
(Continued)

OTHER PUBLICATIONS

Elaine Schaertl Short et Al, Stewart Platform Robot for Interactive Tabletop Engagement, Department of Computer Science, University of Southern California, Dec. 2016, pp. 5 (Year: 2016).*
(Continued)

*Primary Examiner* — Clayton E. LaBalle
*Assistant Examiner* — Kevin C Butler
(74) *Attorney, Agent, or Firm* — K&L Gates LLP

(57) ABSTRACT

A system for stabilizing a device, comprises: A) a base plate provided comprising a plurality of motors; B) a displaceable mounting plate provided with: i) a plurality of bearing assemblies; ii) one or more sensors for measuring the orientation of said mounting plate; and iii) mounting elements for mounting instruments on said mounting plate; C) a plurality of actuators interconnecting between said mounting plate and said base plate, each actuator comprising; a) a shoulder section pivotally coupled to one of said motors of the base plate; b) an arm section coupled to one of said bearing assemblies of said mounting plate; and c) a mediating bearing assembly connecting between said shoulder and arm sections; and D) a processing unit adapted to receive readings from said sensors, to determine a required state of each arm, and to instruct one or more of said motors to rotate.

18 Claims, 20 Drawing Sheets

(51) Int. Cl.
*F16M 13/02* (2006.01)
*G03B 17/56* (2021.01)
*F16M 11/10* (2006.01)
*F41A 23/02* (2006.01)
*B64D 7/06* (2006.01)
*B64C 39/02* (2006.01)

(52) U.S. Cl.
CPC ......... *F16M 13/022* (2013.01); *G03B 17/561* (2013.01); *B64C 39/02* (2013.01); *B64C 2201/121* (2013.01); *B64C 2201/127* (2013.01); *B64D 7/06* (2013.01); *F41A 23/02* (2013.01)

(58) Field of Classification Search
USPC .......................................................... 396/428
See application file for complete search history.

(56) References Cited

U.S. PATENT DOCUMENTS

| | | | | |
|---|---|---|---|---|
| 2007/0064208 | A1* | 3/2007 | Giegerich | F16M 11/425 353/122 |
| 2009/0244302 | A1* | 10/2009 | Tsai | G03B 5/00 348/208.99 |
| 2010/0331150 | A1* | 12/2010 | Patoglu | A61H 3/00 482/79 |
| 2011/0032090 | A1* | 2/2011 | Provancher | G06F 3/039 340/407.1 |
| 2011/0319913 | A1* | 12/2011 | Labadie | A61B 34/30 606/130 |
| 2014/0302462 | A1* | 10/2014 | Vatcher | A63G 31/16 434/55 |
| 2016/0236100 | A1* | 8/2016 | Douglas | G09B 9/14 |
| 2017/0232549 | A1* | 8/2017 | Lacaze | B33Y 80/00 164/469 |
| 2018/0361590 | A1* | 12/2018 | Ting | G05B 19/41805 |
| 2020/0072407 | A1* | 3/2020 | Aharon | F16M 11/18 |

FOREIGN PATENT DOCUMENTS

| | | | | |
|---|---|---|---|---|
| CN | 105171717 A | | 12/2015 | |
| JP | 2000210831 A | | 8/2000 | |
| JP | 102692201 | * | 9/2012 | ............ G01B 21/04 |

OTHER PUBLICATIONS

Loannis Davliakos et Al., A Model-Based Impendance Control of a 6-dof Electrohydraulic Stewart Platform, National Technical University of Athens, Oct. 2006, pp. 9 (Year: 2006).*

Chen Hua, Optimal Design of Stewart Platform Safety Mechanism, Chinese Journal of Aeronautics, Oct. 2006, pp. 370-377 (Year: 2006).*

Arun Dayal Udai; "Stewart Platform for dynamic stabilization"; youtube [online video] Feb. 2, 2017; https://www.youtube.com/watch?v=TgqJbneXZI8, 3 pages (Year: 2017).*

International Search Report for related International Application No. PCT/IL2018/050344; report dated Nov. 1, 2018; (4 pages).

Written Opinion for related International Application No. PCT/IL2018/050344; report dated Nov. 1, 2018; (6 pages).

Arun Dayal Udai; "Stewart Platform for dynamic stabilization"; youtube [online video] Feb. 2, 2017; https://www.youtube.com/watch?v=TgqJbneXZI8;.

Rojer Hess; "Homebuilt Video Camera Stabilizer"; http://technitoys.com/homebuilt-video-camera-stabilizer; Jan. 7, 2014; (21 pages).

* cited by examiner

STABILIZATION SYSTEM

FIELD OF THE INVENTION

The present invention relates to the field of robotic stabilization systems. More particularly, the invention relates to a stabilization system for stably using instruments attached thereto.

BACKGROUND OF THE INVENTION

Accuracy and precision are main keys in optimal operation of a wide variety of instruments. The need to hold instruments steady and to keep them stabilized during various stages of operation gave rise to the need of robotic operation. Accordingly, robotic operation is currently a standard practice in a large variety of industries such as warfare, medicine, industrial production etc.

A problem arises when an instrument is attached to a base that is unfixed (i.e. not connected to the ground or to another foundation capable of withstanding motion and forces that are applied to the base from the instrument), and is still required to perform precise and stable operations. The problem may result from a number of factors, such as the motion of an unfixed base, causing the instrument to move along with it, the motion of the instrument itself while the unfixed base lacks the capability to sustain motion of the instrument, and therefore causes the instrument to move, or a variety of other issues.

This is obviously a major drawback, especially when it comes to apparatus requiring stability during operation. It would therefore be advantageous to have a base to which instruments can be attached, which is capable of absorbing motion during instrument operation. The term "instrument", as used herein refers to any apparatus that generates motion during operation, or that requires motion to operate, and is not limited to any particular type of apparatus. For instance, this term, as understood in respect of the invention, applies equally to a firearm, to an antenna or antenna array (e.g. radar), to optical devices and to surgical robots.

One field of robotic systems focuses on unmanned airborne systems. Such systems are typically controlled remotely by an operator located in a remote control station, and that is in communication, either wirelessly or wiredly, with the system and instruments thereof. An illustrative example of such UAVs (unmanned airborne vehicles) is a drone, which nowadays has become useful in a great variety of applications. One field in which the invention is particularly useful, in this context, is that of photography, which requires a stable positioning of a camera to obtain high-quality images, even if the drone that carries it flies under difficult weather conditions. Another example is the remote use of firearms, which requires that a firearm carried by a drone be stabilized to overcome the recoil resulting from firing it. Many other examples exist, which are not discussed herein for the sake of brevity and which will be apparent to the skilled person.

Moreover, several stabilizing systems available nowadays (such as gimbals), are provided with three or less Degrees Of Freedom (DOF) angular operation. These systems typically require the position of the payload at the center axis of rotation of their motors or of their final transmission output in order to sufficiently maintain stabilization. This requirement limits the size and form factor of the payload. On the other hand the system can overcome these limits, although in order to do so it would be required to be relatively too heavy to be carried by small and lightweight platforms such as drones. In addition having only 3 DOF specifically limits those systems of absorbing shocks and recoil (for instance of a rifle mounted thereon) since they lack additional DOF (3 more) in order to compensate for shocks and platform-induced vibration.

A Stewart Platform is a system capable of stabilizing devices with 6 DOF. Traditional Stewart Platforms comprise two plates (a base plate and a displaceable plate) interconnected by six linear actuators coupled to each of the plates. The displaceable plate can be adjusted with six degrees of freedom relative to the base plate: x, y, z, pitch, roll and yaw. The extension degree of each of the linear actuators changes the overall orientation of the displaceable plate relative to the base plate. FIG. 1A (prior art) schematically illustrates a traditional Stewart Platform 100 in a first state. FIG. 1B (prior art) schematically illustrates Stewart Platform 100 in a second state. Actuation of one or more of the linear actuators (101) results in a new valid set of six degrees of freedom—x, y, z, pitch, roll and yaw.

Due to the linearity of the actuators they are required to extend from, and curtail to a piston of a certain size. Consequently there is a limit in the degree of freedom along the 'z' axis (i.e. collapsing the displaceable plate towards the base plate). This limit also affects the pitch and roll degrees of freedom, and requires a relatively large system. Moreover, an apparatus is required to extend and curtail each actuator, which is a major weight factor of the whole system.

Furthermore, in the case of firearms, in order to efficiently obtain remote control and operation thereof, a system is required to overcome the recoil resulting from firing it, as explained above. Attempting to do so with linear actuators would result in locking of the actuators causing a large shock transferred to the system and hence failure of overcoming the recoil. Alternatively, using very heavy and massive actuators that are capable of compensating for shock caused by the recoil (such as a pneumatic system or a linear DC motor) is not practical, since such actuators are far too heavy to be carried by a compact platform such as a drone as part of a lightweight 6 DOF system.

It is therefore an object of the present invention to provide a stabilization system capable of absorbing shock and stabilizing motion with a 6 DOF angular operation.

It is another object to provide a stabilization system with a 6 DOF angular operation with less limit in the DOF than the prior art stabilization systems.

It is yet another object to provide a stabilization system with a 6 DOF angular operation that weighs less and is more compact than the prior art stabilization systems.

It is still another object to provide a stabilization system capable of withstanding large shock caused by firearm recoil.

Other objects and advantages of this invention will become apparent as the description proceeds.

SUMMARY OF THE INVENTION

The present invention relates to a system for stabilizing a device that can be connected thereto with a plurality of degrees of freedom, comprising:
   a. a base plate provided comprising a plurality of motors;
   b. a displaceable mounting plate provided with:
      i. a plurality of bearing assemblies;
      ii. one or more sensors for measuring the orientation of said mounting plate; and
      iii. mounting elements for mounting instruments on said mounting plate;

c. a plurality of actuators interconnecting between said mounting plate and said base plate, each actuator comprising;
   A. a shoulder section pivotally coupled to one of said motors of the base plate;
   B. an arm section coupled to one of said bearing assemblies of said mounting plate; and
   C. a mediating bearing assembly connecting between said shoulder and arm sections; and
   D. a processing unit adapted to receive readings from said sensors, to determine a required state of each arm, and to instruct one or more of said motors to rotate.

According to an embodiment of the invention, the system comprises six actuators the shoulder sections of which are coupled to six motors and the arm sections of which are coupled to six bearing assemblies of the mounting plate, thereby granting six degrees of freedom.

According to another embodiment of the invention, the bearing assemblies of the displaceable mounting plate comprise:
   A. a first ring;
   B. a rod connected to an axial bearing and provided with an anchoring ball suitable to be accommodated in said first ring;
   C. a second ring connected at its two extremities to said first ring, having an inner shape such that allows it to rotate around said first ring; and
   D. connecting elements provided in said first ring and in said second ring, suitable to connect them to additional structures.

According to yet another embodiment of the invention, the one or more sensors include one or more Inertial Measurement Units. According to another embodiment of the invention, the base plate further comprises one or more sensors for measuring the orientation of said base plate.

According to still another embodiment of the invention, the system further comprises one or more belts and gear assemblies associated with each motor and shoulder section, wherein said one or more belts and gears transfer rotational movement from the motor to the shoulder section associated therewith.

According to an embodiment of the invention, the mediating bearing assemblies of the actuators comprise:
   A. a first ring;
   B. a rod connected to an axial bearing and provided with an anchoring ball suitable to be accommodated in said first ring;
   C. a second ring connected at its two extremities to said first ring, having an inner shape such that allows it to rotate around said first ring; and
   D. connecting elements provided in said first ring and in said second ring, suitable to connect them to additional structures.

According to another embodiment of the invention, the base plate and mountable displaceable plate are hexagonal. According to another embodiment of the invention, the angular position of each shoulder section is monitored and controlled by a rotary encoder.

According to another embodiment of the invention, the system further comprises imaging equipment adapted to obtain images from the point of view of the system. According to another embodiment of the invention, the mounting elements are configured to mount a device selected from a firearm, an optical device or a lighting device.

According to another embodiment of the invention, the processing unit comprises an input module; an output module; and a processing module.

In another aspect, the present invention relates to a system for remotely stabilizing a device, comprising:
   a) a remote control station comprising:
      i. a mobile computational device with a touchscreen;
      ii. a joystick;
      iii. a power supply;
      iv. one or more operation buttons; and
      v. communication elements configured to communicate with remote systems; and
   b) a system for stabilizing a device as mentioned above, further comprising communication elements configured to communicate with said remote control station.

According to an embodiment of the invention, the communication elements of the remote control station comprise a high-frequency receiver and antenna, a low-frequency transceiver and antenna, and an interface for transferring data between said receiver and transceiver and said mobile computational device.

According to another embodiment of the invention, the system further comprises communication circuitry suitable to communicate between the displaceable mounting plate and the base plate either wirelessly or by wired connection.

In a further aspect, the present invention relates to a method for stabilizing a device comprising:
   A. connecting said device to a system for stabilizing a device, as mentioned above;
   B. determining a required orientation of said device;
   C. sensing the current orientation of said device; and
   D. comparing the orientation of said device to said required orientation.

According to an embodiment of the invention, the required orientation of the device is determined according to instructions stored in a local memory unit that is a part of the system. According to another embodiment of the invention, the required orientation of the device is determined from instructions received at the system from a remote control station. According to another embodiment of the invention, comparison of the orientation of the device to the required orientation comprises:
   A. detecting, by the processing unit, a difference between a current orientation of said device and said required orientation;
   B. calculating, by said processing unit, a value of said difference and a desired angle for each of the motors;
   C. instructing said motors to obtain said desired angles; and
   D. obtaining, by the motors, said desired angles.

According to another embodiment of the invention, obtaining the desired angles by the motors actuates the actuators, such that when the shoulder section of an actuator rotates along with the motor to which it is coupled, the rotation is translated via the mediating bearing assembly of the actuator to planar motion of the arm section of the actuator, and the planar motion is translated to a pulling/pushing planar force applied to the bearing assembly to which the arm section of the actuator is coupled.

In still another aspect, the present invention relates to a stabilized device, connected to a system for stabilizing a device, as mentioned above. As will be apparent to the skilled person, many different devices can be used in conjunction with the invention, such as, for instance:
   a firearm;
   an antenna or antenna array;
   surgical apparatus; and
   an optical device.

According to still another embodiment of the invention, the system for stabilizing a device, as mentioned above, is suitable to be connected to a structure selected from:
an aerial vehicle;
a UAV;
a land vehicle;
a water vessel;
the ground; and
a precision apparatus

DETAILED DESCRIPTION OF THE INVENTION

The system comprises a stabilization system, the principle of which is based on a modified Stewart Platform. The system further comprises a plurality of sensors, a processor, and communication elements for communicating between the system and an operator of the system. Each element will now be described in further detail.

Figure 2:
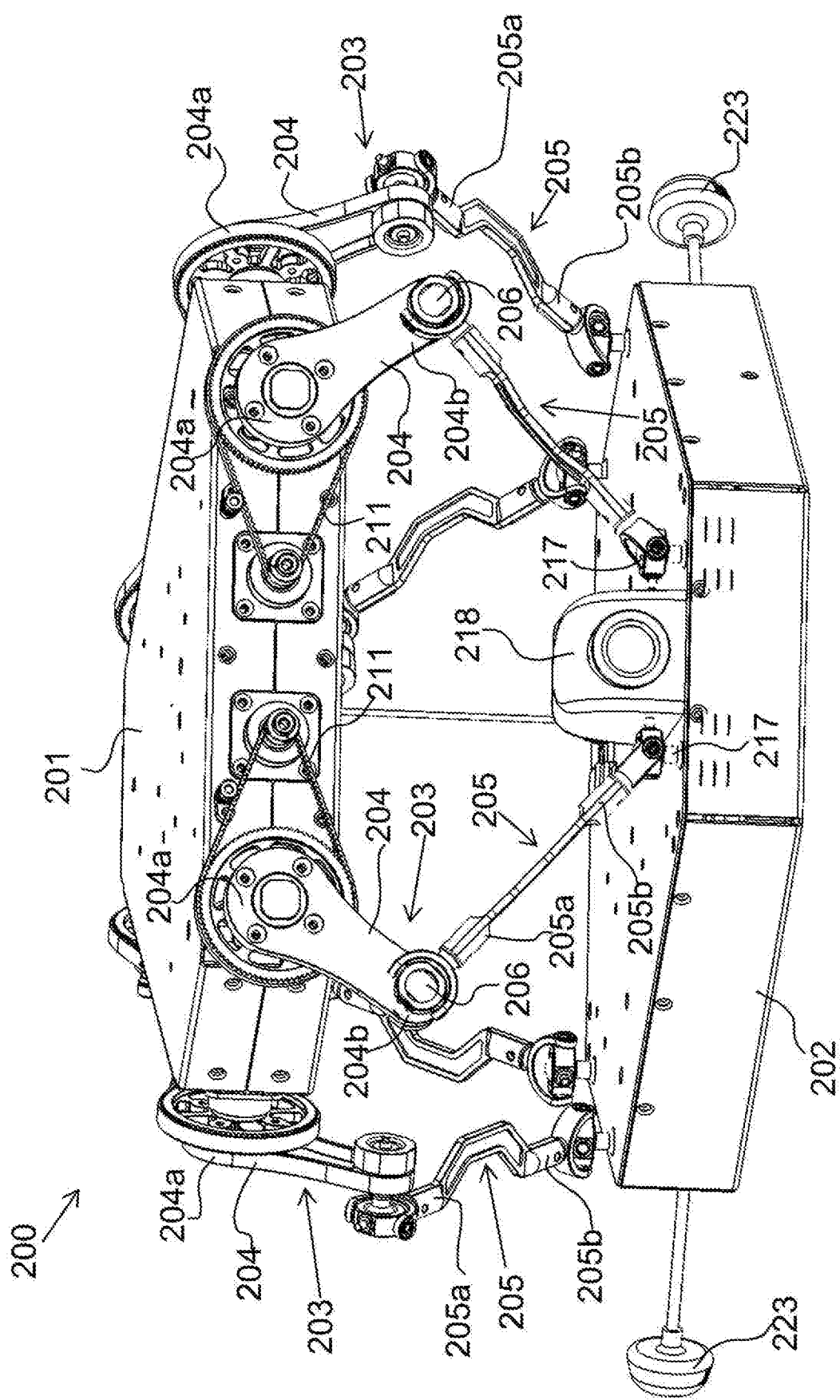
FIG. 2 schematically illustrates a perspective view of a stabilization system according to an embodiment of the invention.
Figure 13:
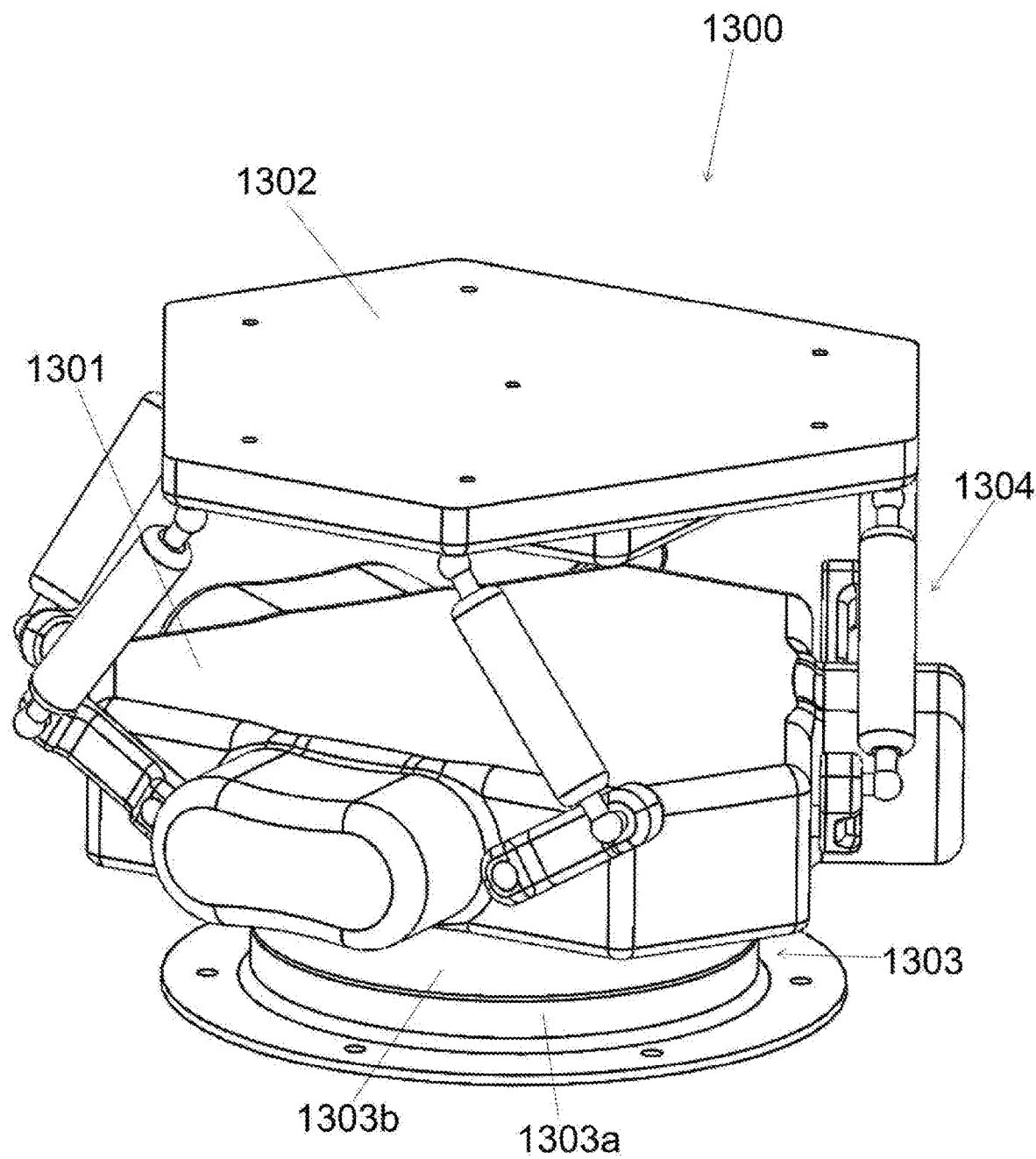
FIG. 13 shows a perspective view of a stabilization system according to another embodiment of the present invention.

The stabilization system of the present invention, similar to a Stewart Platform (and therefore also referred to herein as "Modified Stewart Platform"), comprises a base plate and a displaceable mounting plate interconnected by a plurality of actuators, each of which is capable of being individually adjusted. The base plate comprises a connection element for connecting the base plate to various structures, such as an aerial vehicle, a UAV, a land vehicle, a water vessel, the ground, precision apparatus, or any other mobile or fixed structure. The displaceable mounting plate comprises mounting elements for mounting various instruments on the stabilization system, such as firearms, imaging and other optical devices, lighting devices or any other apparatus that requires stabilization. FIG. 2 schematically illustrates a perspective view of a stabilization system 200 according to an embodiment of the invention in which base plate 201 is located above displaceable mounting plate 202. FIG. 13 shows a perspective view of a stabilization system 1300 according to another embodiment of the present invention, in which displaceable mounting plate 1302 is located above base plate 1301.

Figure 3:
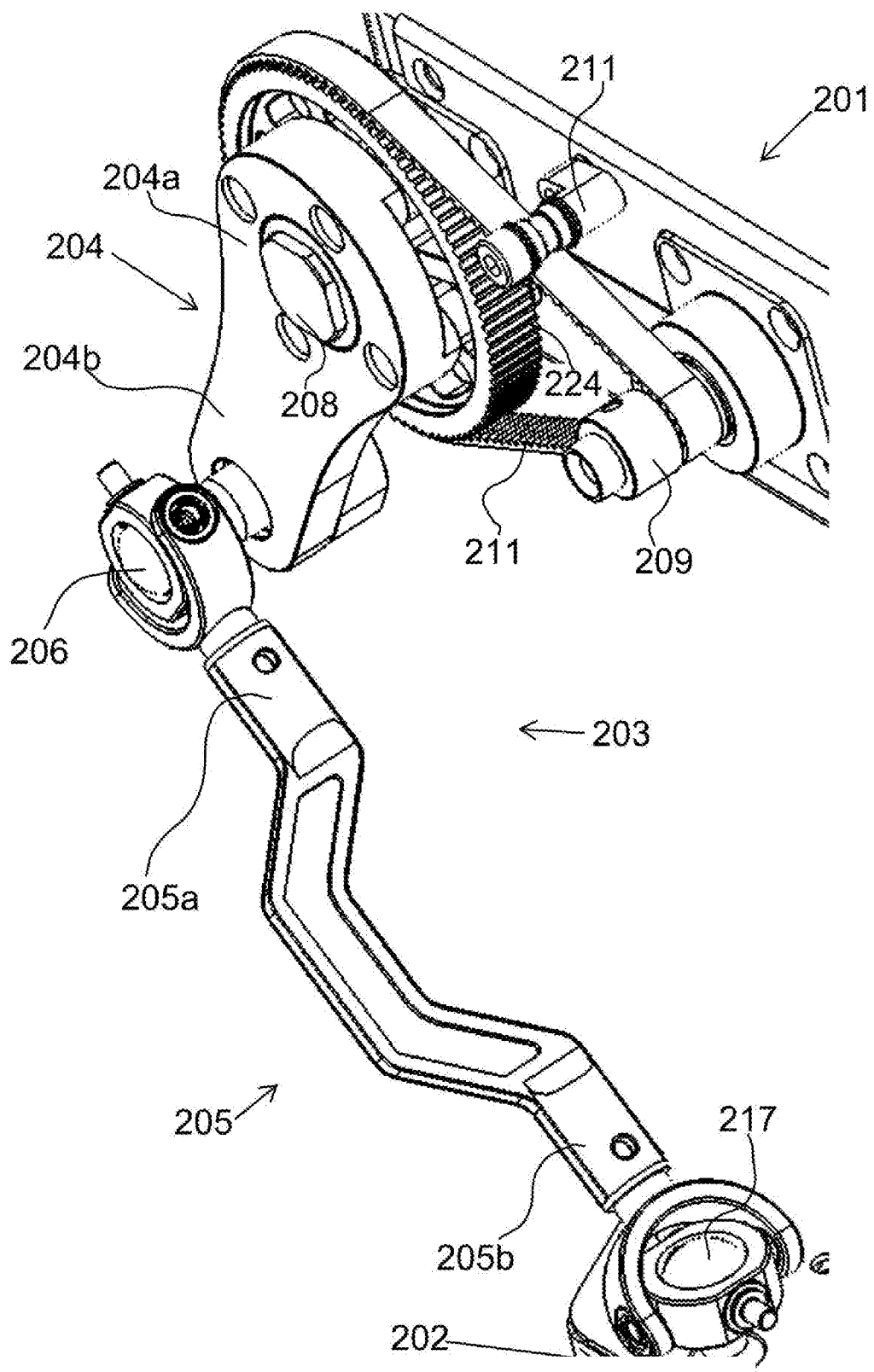
FIG. 3 schematically illustrates a perspective view of an actuator according to an embodiment of the invention.

In contrast to the linear actuators of traditional Stewart Platforms, each actuator of the present invention (three of which are indicated by numeral 203 in the figure) comprises two sections: a shoulder section 204 and an arm section 205 that are both made of a rigid material (e.g. metal, metal alloy, reinforced plastic, etc.). FIG. 3 schematically illustrates a perspective view of an actuator 203 according to an embodiment of the invention. As shown in FIGS. 2 and 3, one end (i.e. 204a) of the shoulder section 204 of each actuator 203 is coupled to base plate 201 and the other end 204b is connected to a mediating bearing assembly 206. One end (i.e. 205a) of each arm section 205 is coupled via the mediating bearing assembly (206) to the shoulder section 204 of the actuator 203, and the other end 205b is connected to a second bearing assembly 217 coupling the arm section (and therefore the actuator) to the displaceable plate.

An illustrative and non-limitative example of suitable bearing assemblies 206 and 217 is described below, with reference to FIGS. 11A and 11B. As opposed to the spherical bearings known in the art, which also enable movement around three vertical axes, but due to their structure, are only capable of a limited range of movement, the bearing assembly of the invention is designed with a unique structure, resulting in a significantly greater range of movement.

Figure 11A:
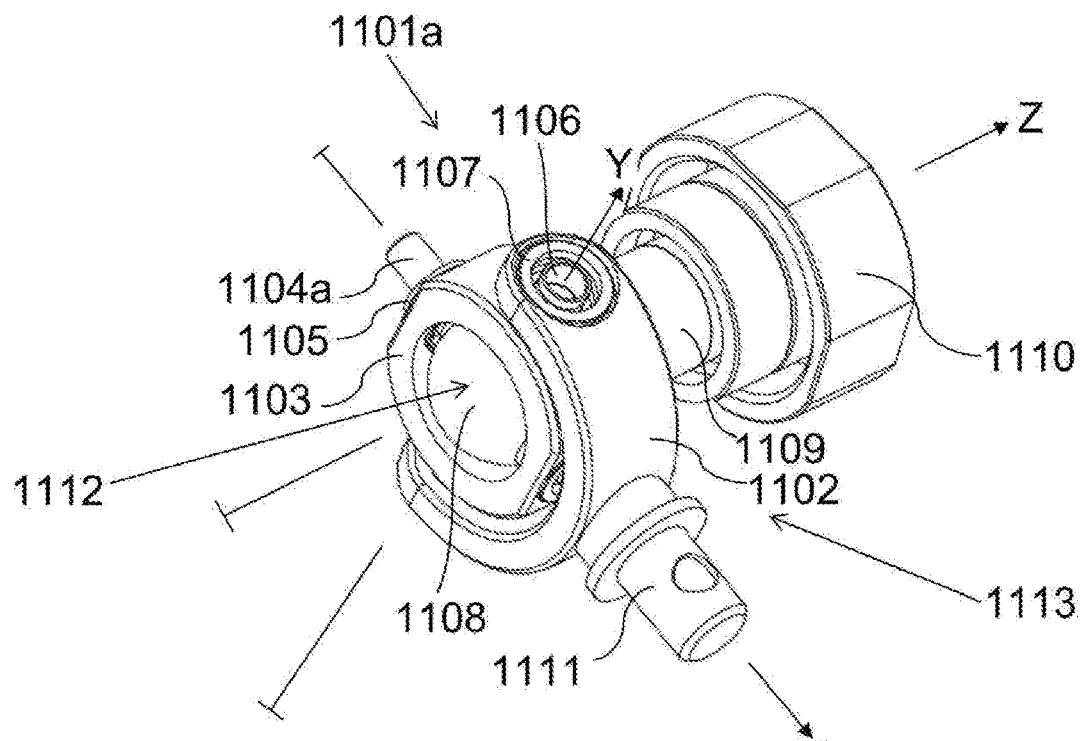
FIG. 11A schematically illustrates an isometric view of a bearing assembly according to an embodiment of the invention.

Referring to FIG. 11A, an isometric view of a bearing assembly 1101a is shown, according to an embodiment of the invention. Bearing assembly 1101a comprises a bearing device 1113 and of an axial bearing 1110. Assembly 1101a is capable of moving along three axes: axis X, corresponding to pin 1104a, axis Y, corresponding to pin 1106 and axis Z, corresponding to connecting rod 1109, designed to be vertical to one another and intersect at the same point—the origin located on line 1112 (the origin itself cannot be shown). For each of the three axes there is a component designated to turn around it. The superposition of said rotations results in the full spatial rotational movement of connecting element 1111, which is connected to the extremity of external ring 1102, relative to the origin 1112 at a great range. In bearing assembly 1101a external ring 1102, which is connected to internal ring 1103 by pin 1106 and two bolts 1107 from each side, is designed to turn around axis Y of pin 1106. Internal ring 1103 accommodates anchoring ball 1108 and is connected to it by pin 1104a and by two bolts 1105 from each side. The connections are not limited to bolts and can be of any suitable type known to the skilled person, such as screws or other fasteners. Ball 1108 that is connected integrally to rod 1109, turns around axis X. Axial bearing 1110, located at the extremity of rod 1109, allows rotation around axis Z.

Figure 11B:
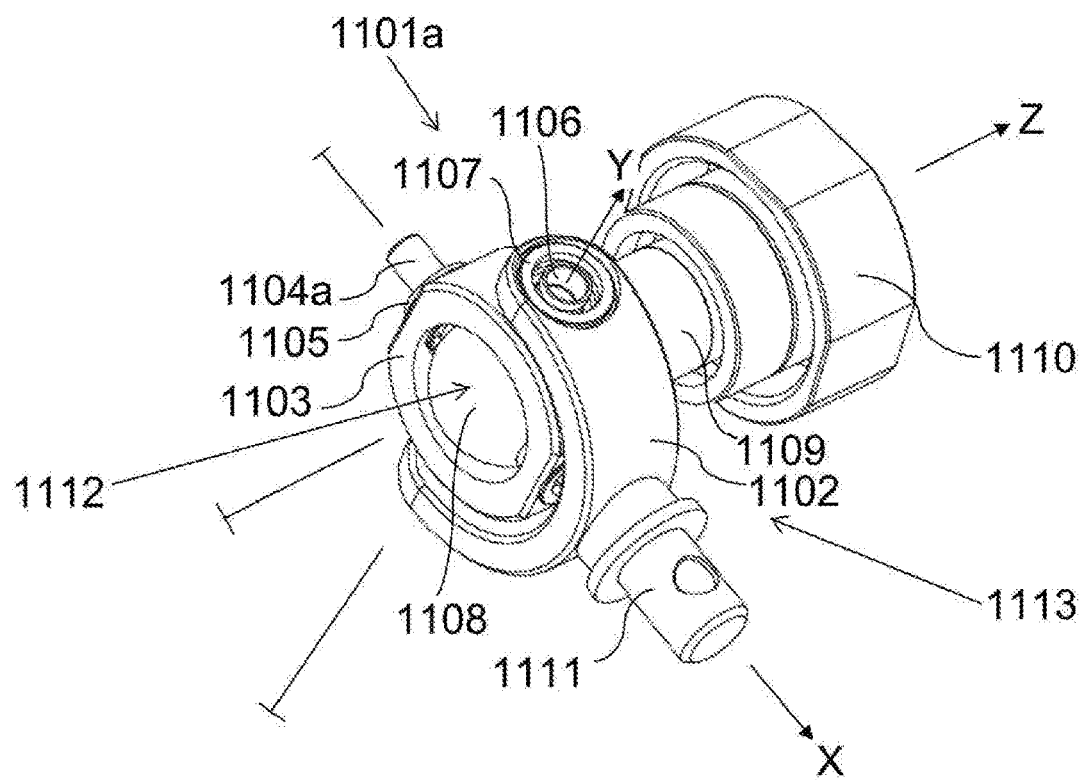
FIG. 11B schematically illustrates an isometric view of a bearing assembly according to another embodiment of the invention.

FIG. 11B illustrates a bearing assembly 1101a according to another embodiment of the invention that is similar to bearing assembly 1101a of FIG. 11A, with the difference that instead of pin 1104a that is removed, assembly 1101a of FIG. 11B comprises a fastening element 1104a of FIG. 11B configured to keep and lock the bolt 1105 in place. The other parts, the rotation and the inter relations between the parts of the bearing assembly 1101a of FIG. 11B, as well as its form of use as described hereinabove are all similar to those of bearing assembly 1101a of FIG. 11A. This embodiment affords additional freedom around the Z axis due to the removal of pin 1104.

Figure 11C:
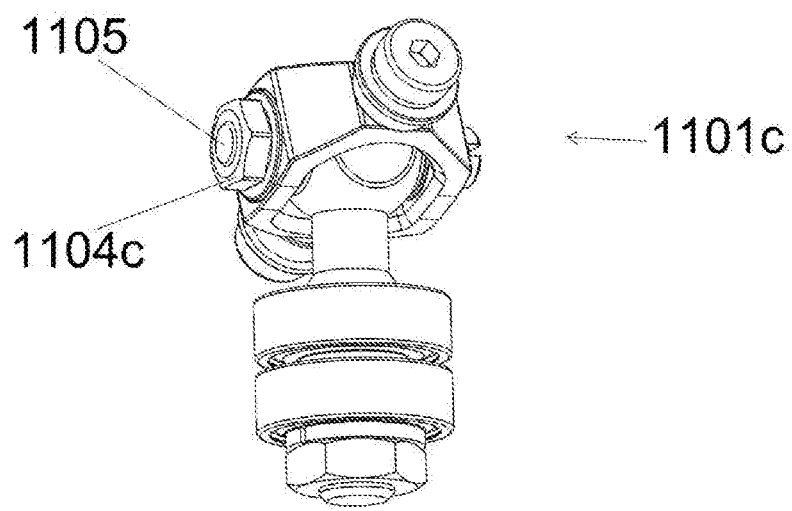
FIG. 11C schematically illustrates an isometric view of a bearing assembly according to yet another embodiment of the invention.

FIG. 11C illustrates a bearing assembly 1101c according to a third embodiment of the present invention, in which fastening element 1104b of FIG. 11B is in the form of a nut 1104c, configured to keep and lock bolt 1105 in place. Axial bearing 1110 is shown as an integral part of the bearing assembly 1101c. Ball 1118 is in the form of a sphere truncated on each of its six sides.

It is clear that the bearing assembly 1101a-c is not limited to the components shown in FIGS. 11A-11C and can be of varied shape and size and may employ different components, such as rods, pins, bearings and the like, to allow to handle different types and intensity of load, and to meet specific requirements needed for any given application.

Figure 12A:
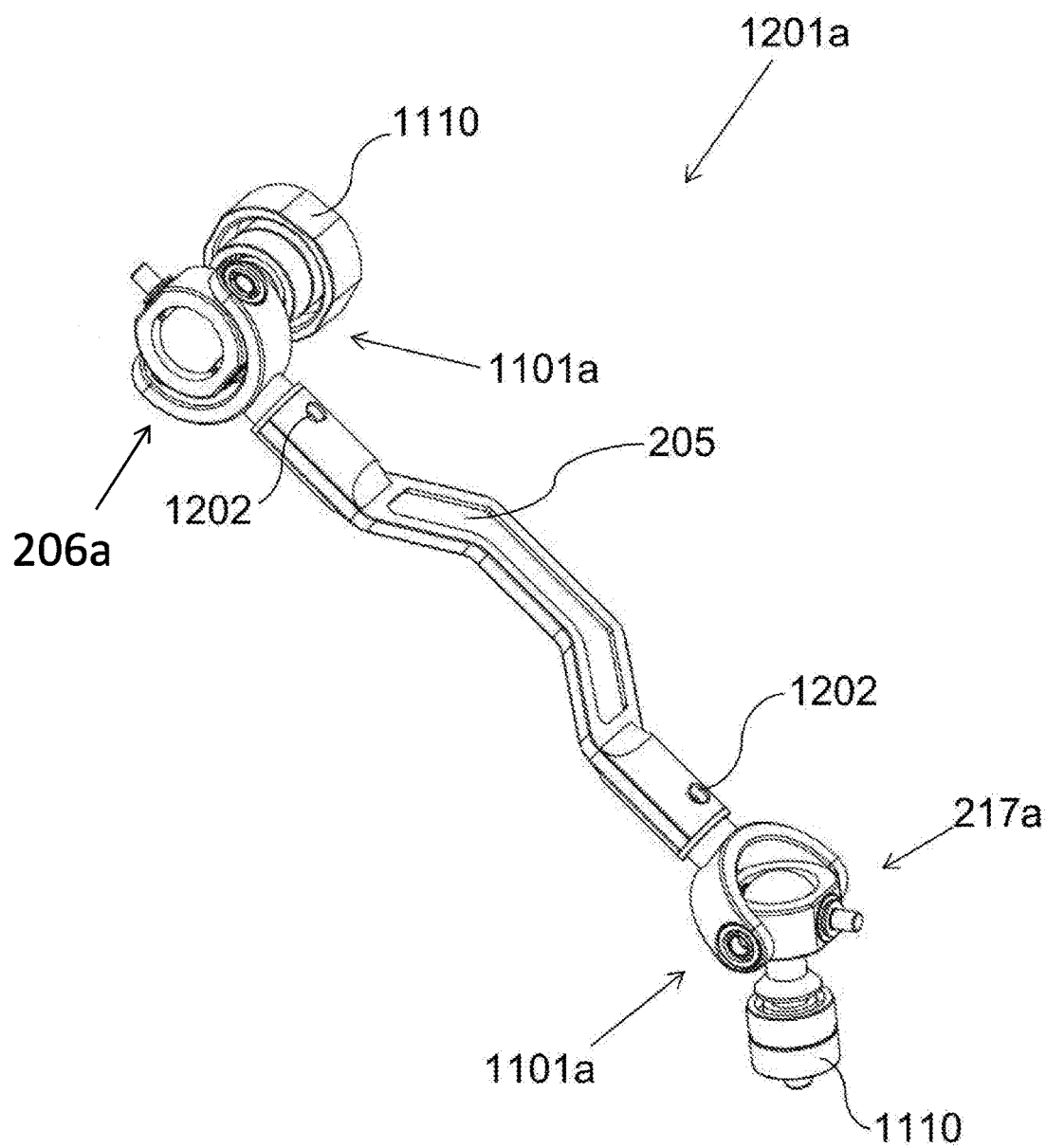
FIG. 12A schematically illustrates an isometric view of an arm assembly according to an embodiment of the invention.
Figure 12B:
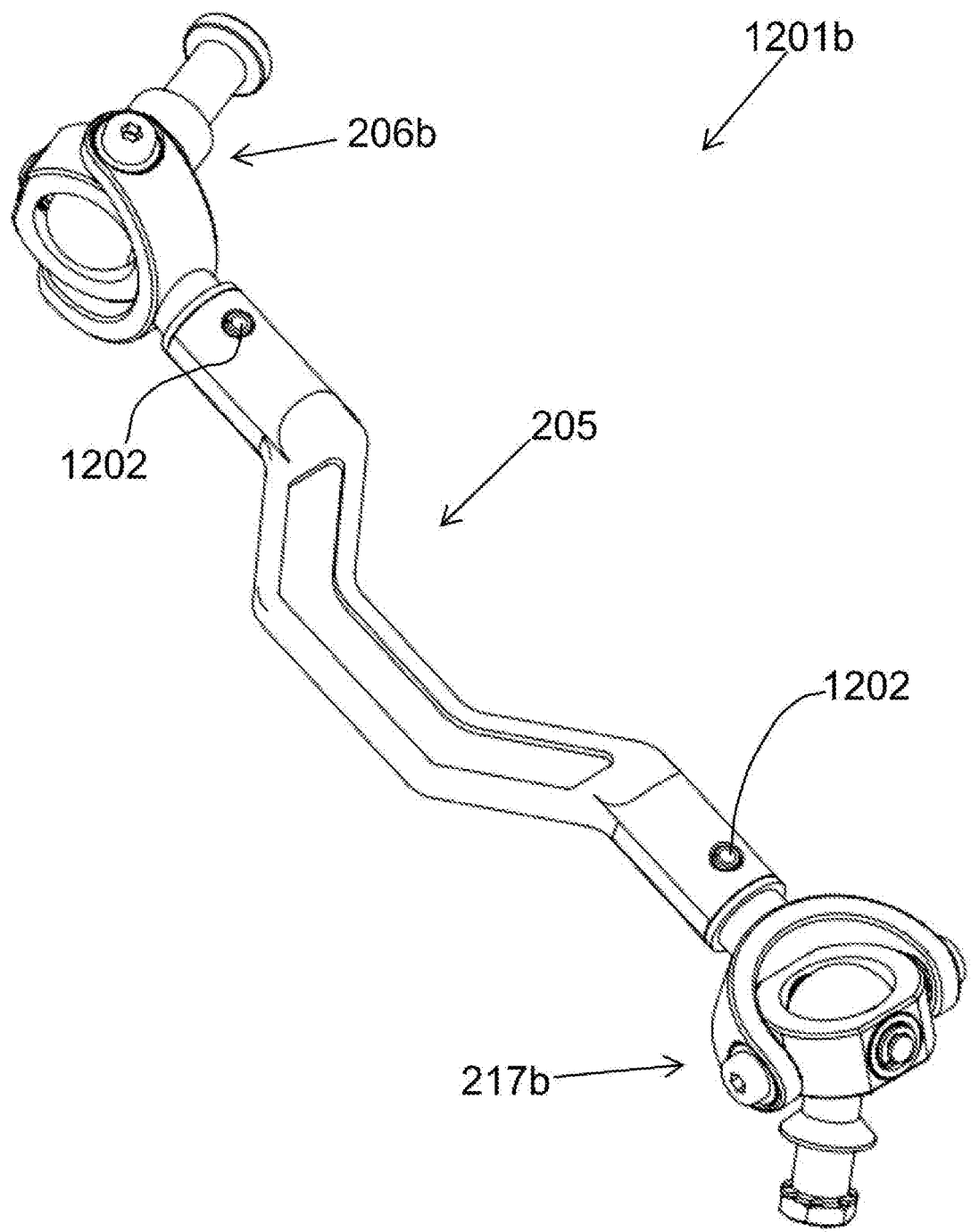
FIG. 12B schematically illustrates an isometric view of an arm assembly according to another embodiment of the invention.
Figure 12C:
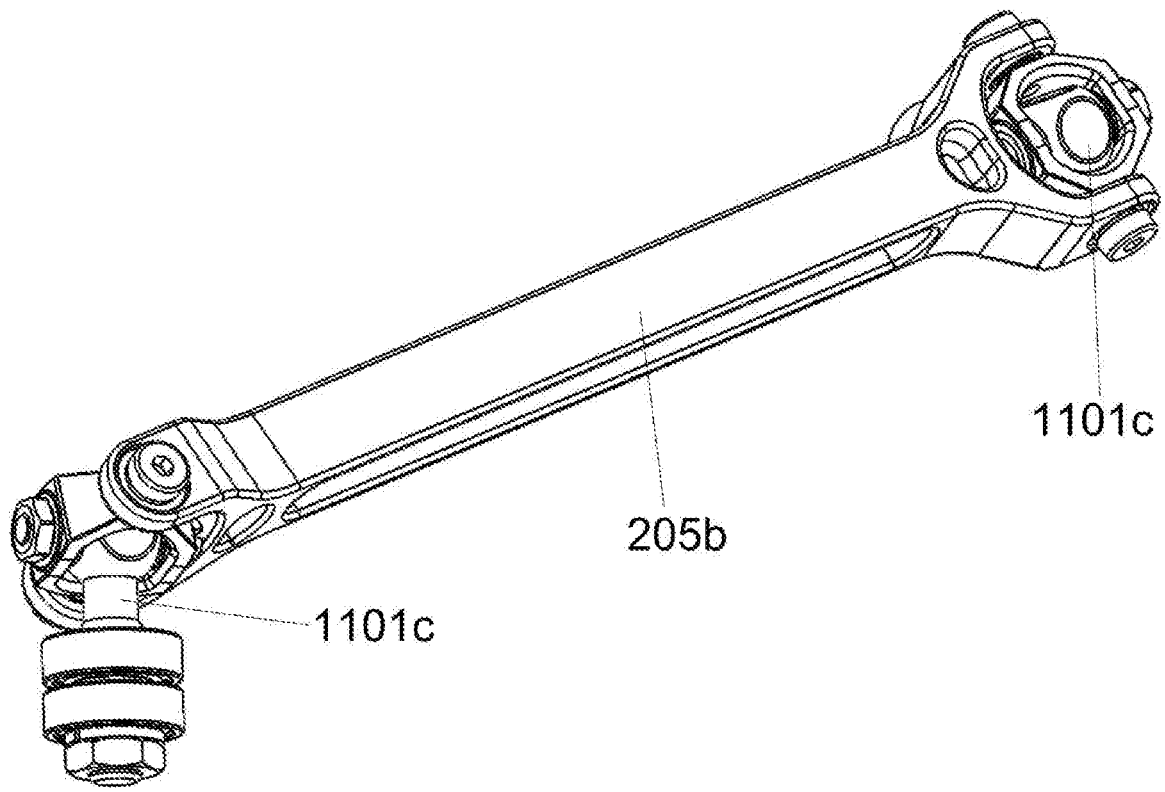
FIG. 12C schematically illustrates an isometric view of an arm assembly according to yet another embodiment of the invention.

FIG. 12A is an isometric view of an arm assembly 1201a comprising two bearing assemblies 206a and 217a (which correspond to bearing assembly 1101a of FIG. 11A), and an arm section 205. In the embodiment illustrated in FIG. 12A, arm section 205 is connected to bearing assembly 1101a at both ends by pins 1202. The connection of arm section 205 to bearing device 1101a grants arm assembly 1201a the ability to move in wide range with many degrees of freedom, to allow reaching a desired unique form required by an application. FIG. 12B is an isometric view of another arm assembly 1201b comprising two bearing assemblies 206b and 217b (which correspond to bearing assembly 1101b of FIG. 11B), the arm section 205 and pins 1202 of FIG. 12A. FIG. 12C shows an isometric view of an arm assembly 1201c according to yet another embodiment of the invention, in which a straightened and enforced arm section 205b is integrated with a bearing assembly 1101c on each of its sides. The shape of arm section 205b allows it to be directly connected to the bearing assemblies without the need of pins (e.g., 1202 in FIGS. 12A and 12B).

It is noted that although the embodiments illustrated in the figures show a base plate and a displaceable plate that are hexagonal and provided with six actuators, a stabilization system according to the present invention is not limited to specific shaped plates, nor is it limited to a specific number of actuators of a specific shape, and can comprise plates of any shape and a plurality of actuators with shoulder and arm sections of any shape.

Figure 1A:
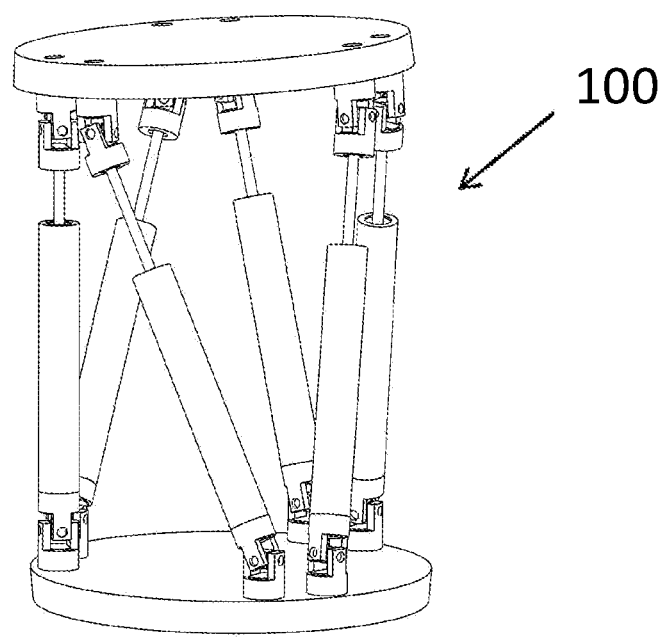
FIGS. 1 (A and B) schematically illustrates a conventional Stuart Platform.
Figure 1B:
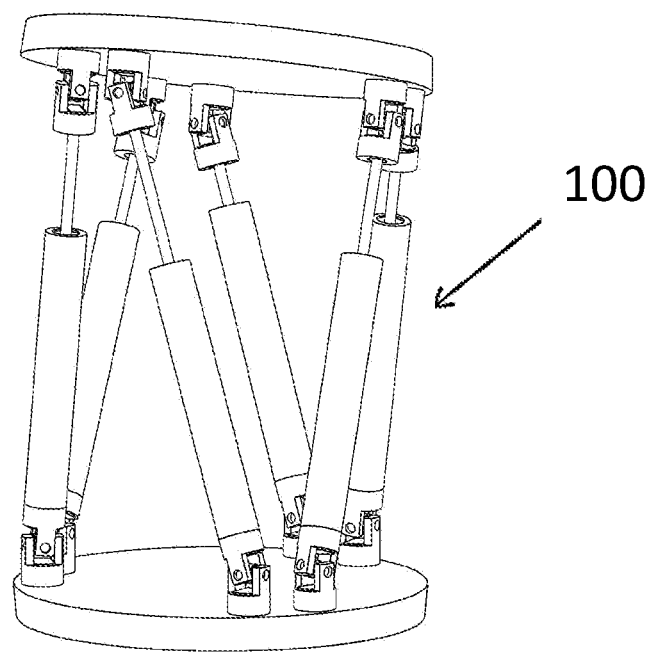
Figure 4A:
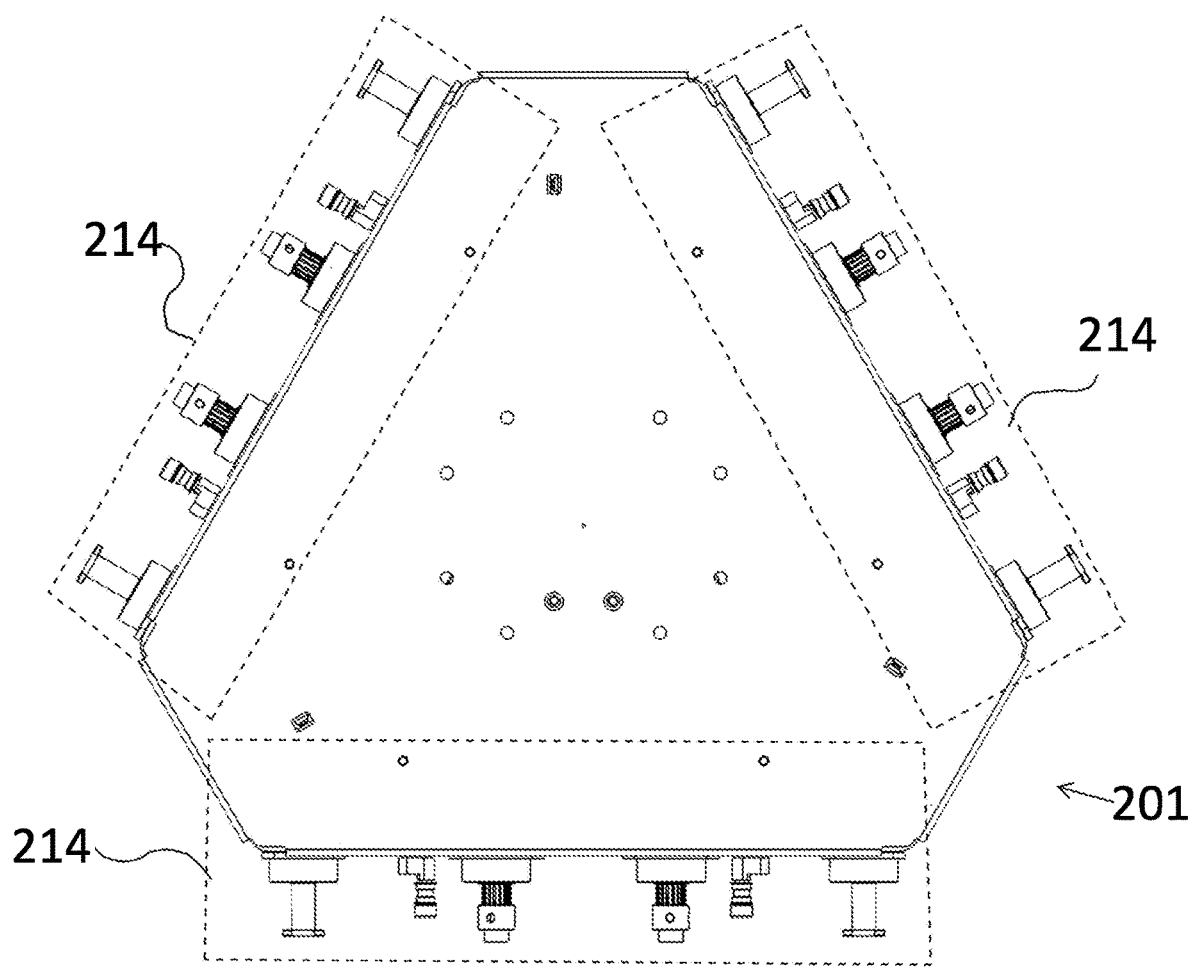
FIGS. 4 (A and B) schematically illustrate a top and front view (respectively) of a base plate according to an embodiment of the invention.
Figure 4B:
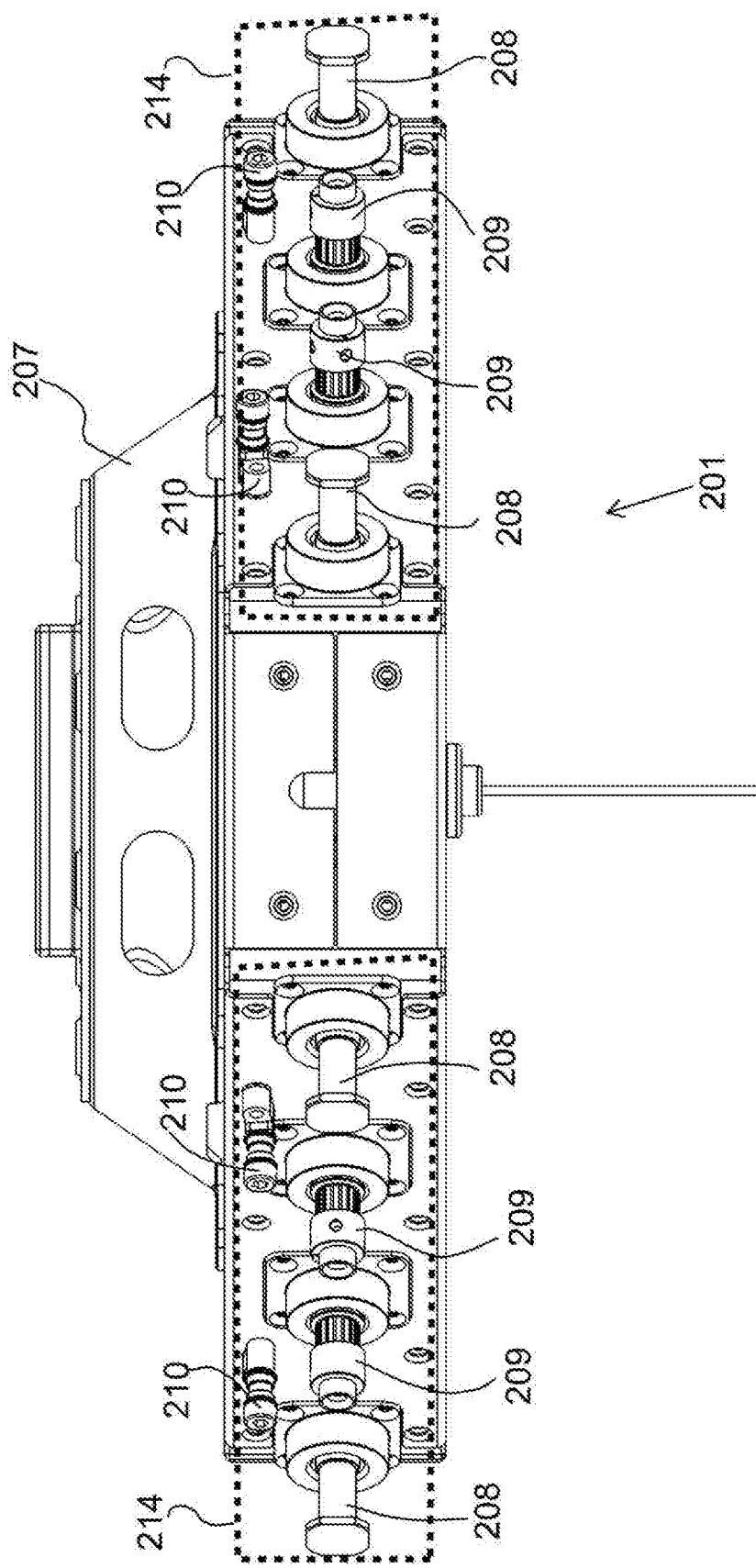

FIGS. 4A and 4B schematically illustrate a top and front view (respectively) of the base plate 201 of FIG. 1. A connection element (207 in FIG. 4B) is provided on the top side of plate 201 (not shown in FIG. 4A) for connecting the base plate to a desired apparatus (e.g. a drone). Every other side of the hexagonal base plate 201 comprises a plurality of protrusions arranged in panel 214. The broken lines in the figures indicate the space occupied by the panel both inside and outside base plate 201. Each panel comprises two groups of three protrusions each, i.e. axle 208, gear 209, and belt tensioning elements 210. Axles 208 are used as pivots for shoulder sections 204. When coupled to axles 208, shoulder sections 204 are rotated as result of rotation of belts (211 in FIG. 2) that circumscribe gears 209 and shoulder sections 204. Belt tensioning elements 210 are used for maintaining the orbit of belts 211 in course with shoulder sections 204, and for keeping belts 211 tensioned.

Figure 5:
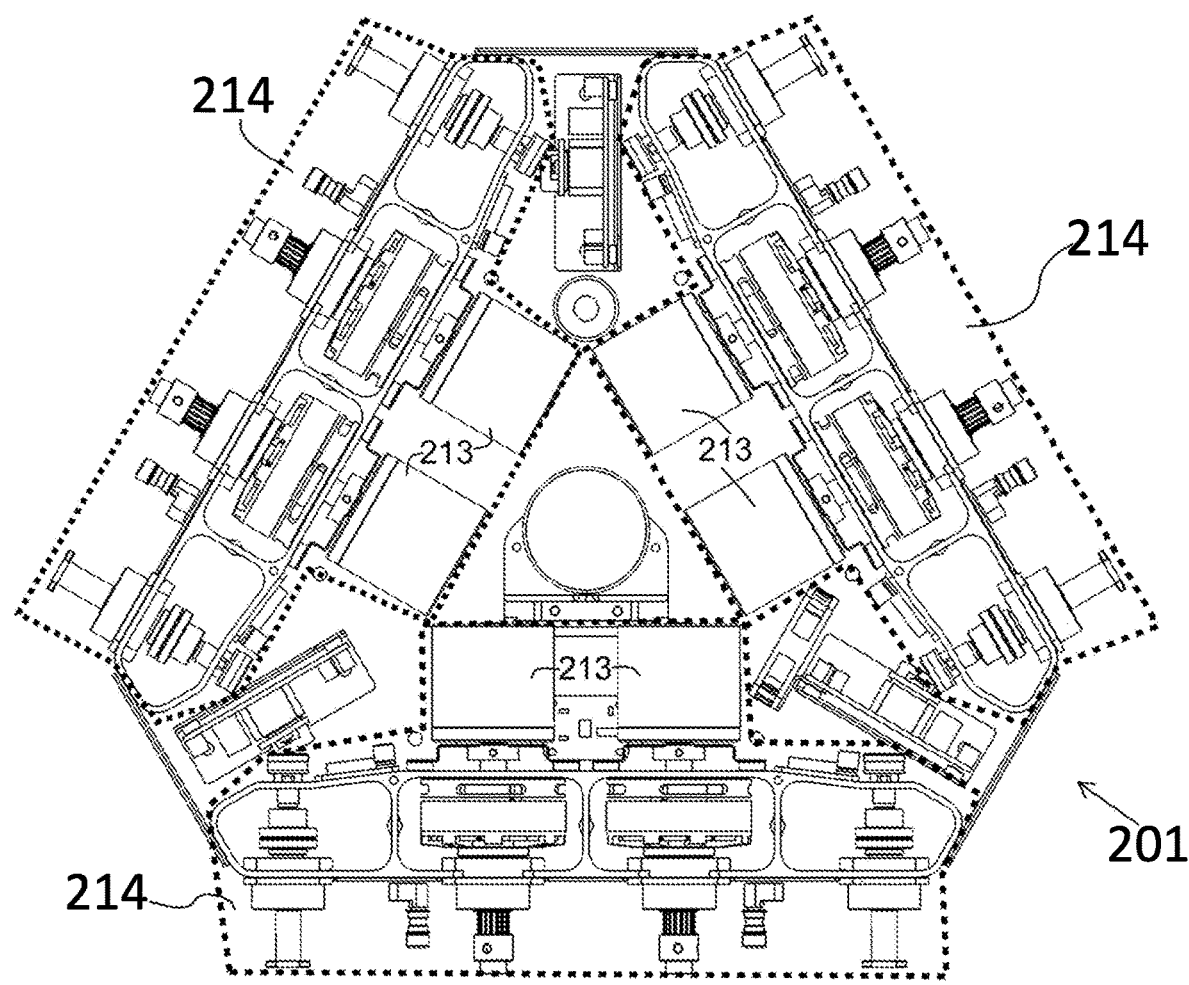
FIG. 5 schematically illustrates a top view of the base plate with its housing removed.
Figure 6A:
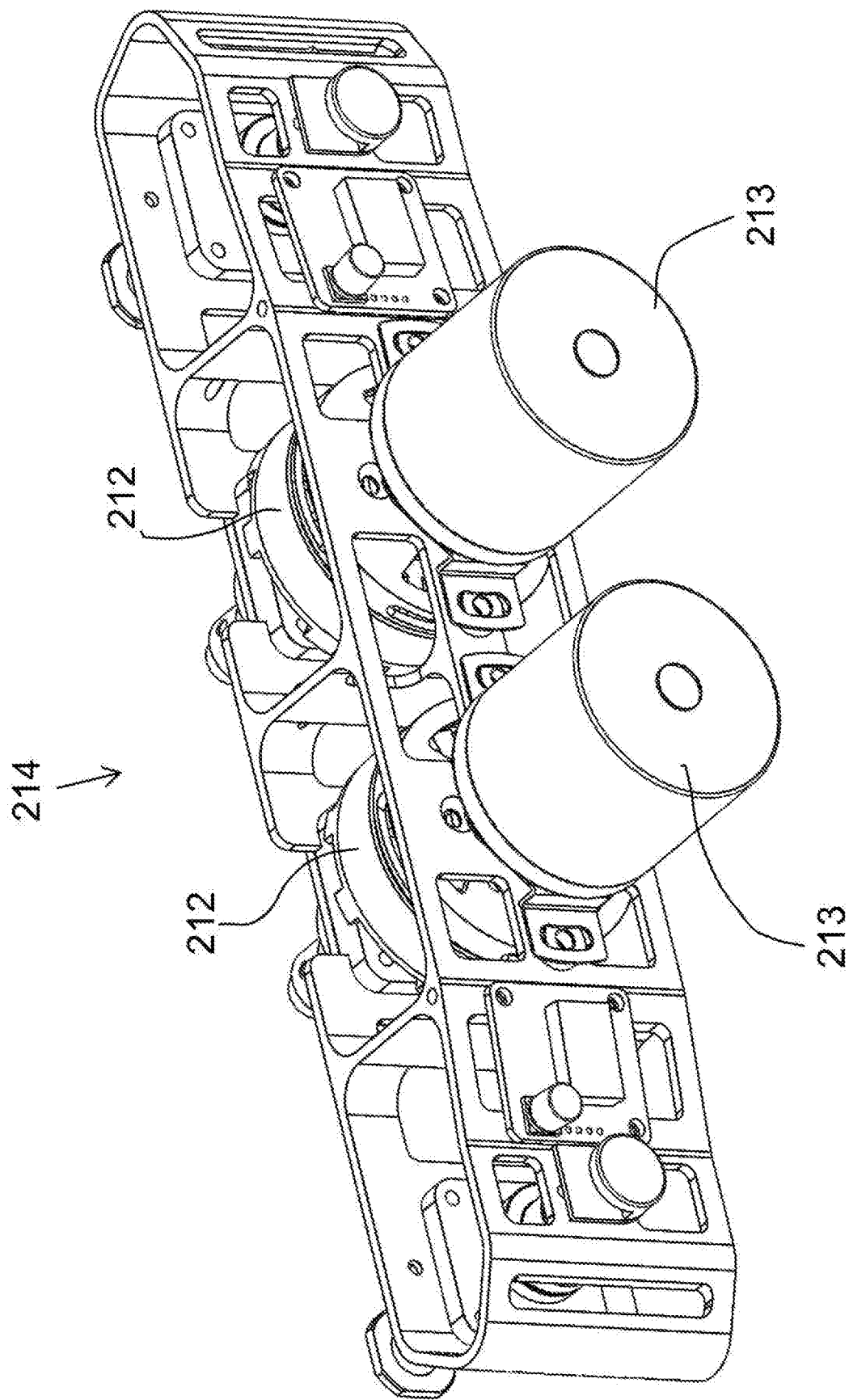
FIGS. 6 (A and B) schematically illustrate perspective views of a actuator panel.
Figure 6B:
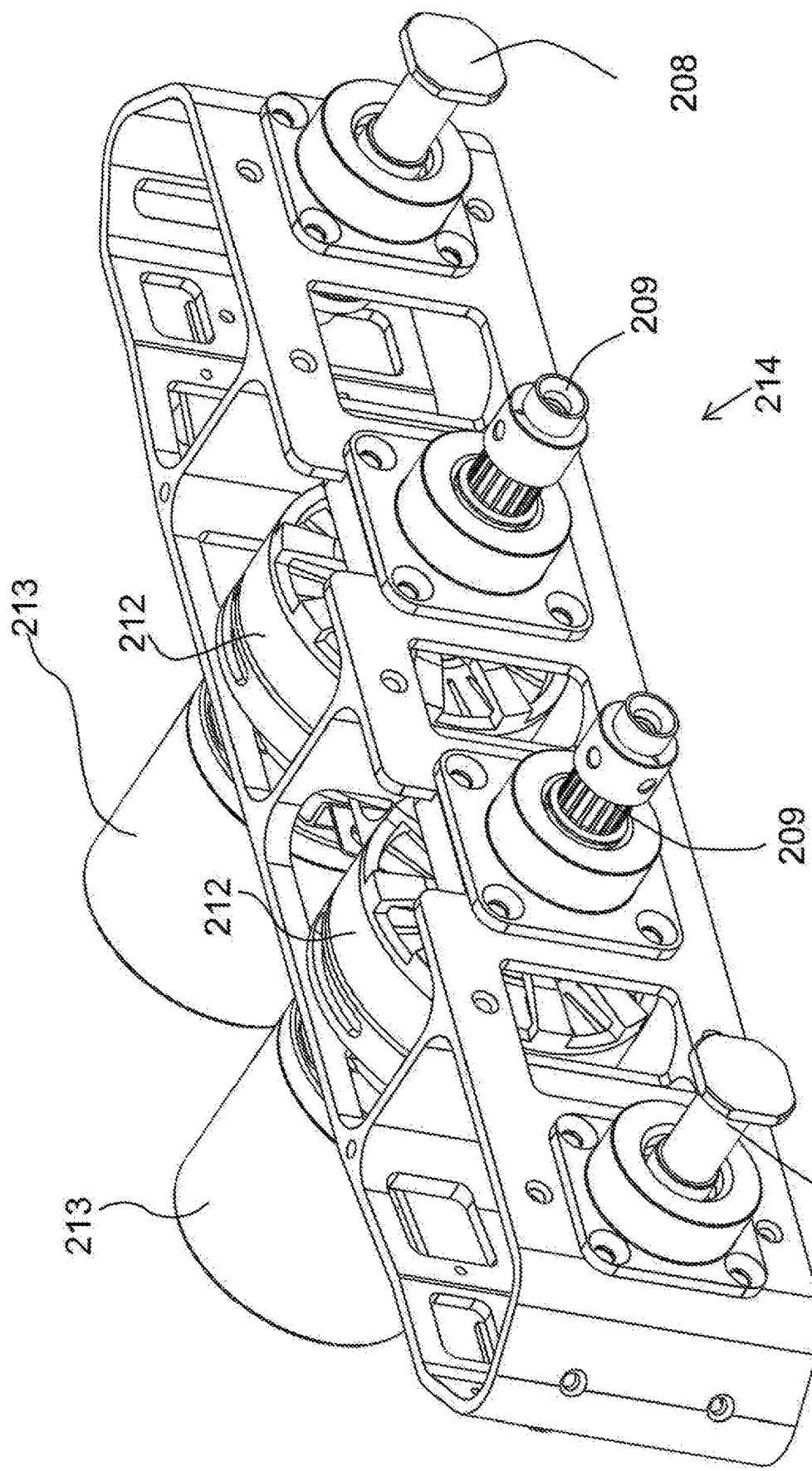

FIG. 5 schematically illustrates a top view of the base plate 201 with its housing removed. FIGS. 6A and 6B schematically illustrate different perspective views of a control panel 214. A plurality of motors 212 are provided for independently rotating each of gears 209. In result, belts 211 of FIG. 3 (not shown) rotate around their abovementioned orbit, transferring the rotational movement of the motors to shoulder sections 204 that are coupled to the axles 208. The angular position of each shoulder section 204 is monitored and controlled by a rotary encoder 213. Motor drivers 215 are provided for controlling motors 212.

When system 200 is brought up, whether from a former position or by switching it on, each motor is at a specific angle not known to the system 200. In order to detect the initial angle, each motor 212 is further connected to a potentiometer (not shown). By measuring the value of the resistance of the potentiometers, the system is able to detect the initial angle of the motors 212. After this calibration, the motors receive a target angle and rotate thereto in order to rotate a shoulder connected thereto. Rotary encoders 213 are used as feedback for the angles of motors 212 and incremental position (i.e. the number of turns). This configuration allows control of the absolute angle of each of the shoulders.

Figure 7A:
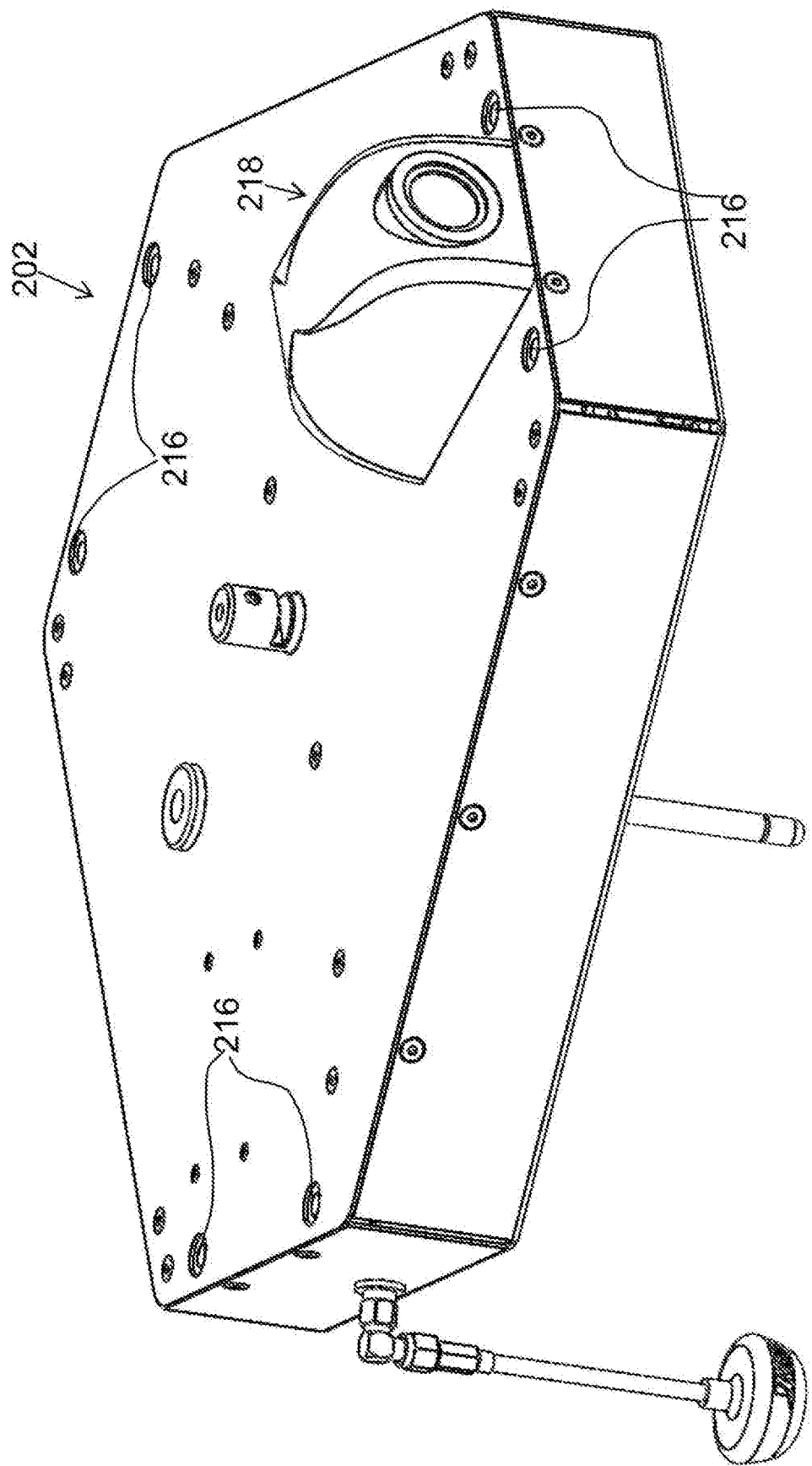
FIGS. 7 (A and B) schematically illustrate perspective views of a displaceable mounting plate according to an embodiment of the invention.
Figure 7B:
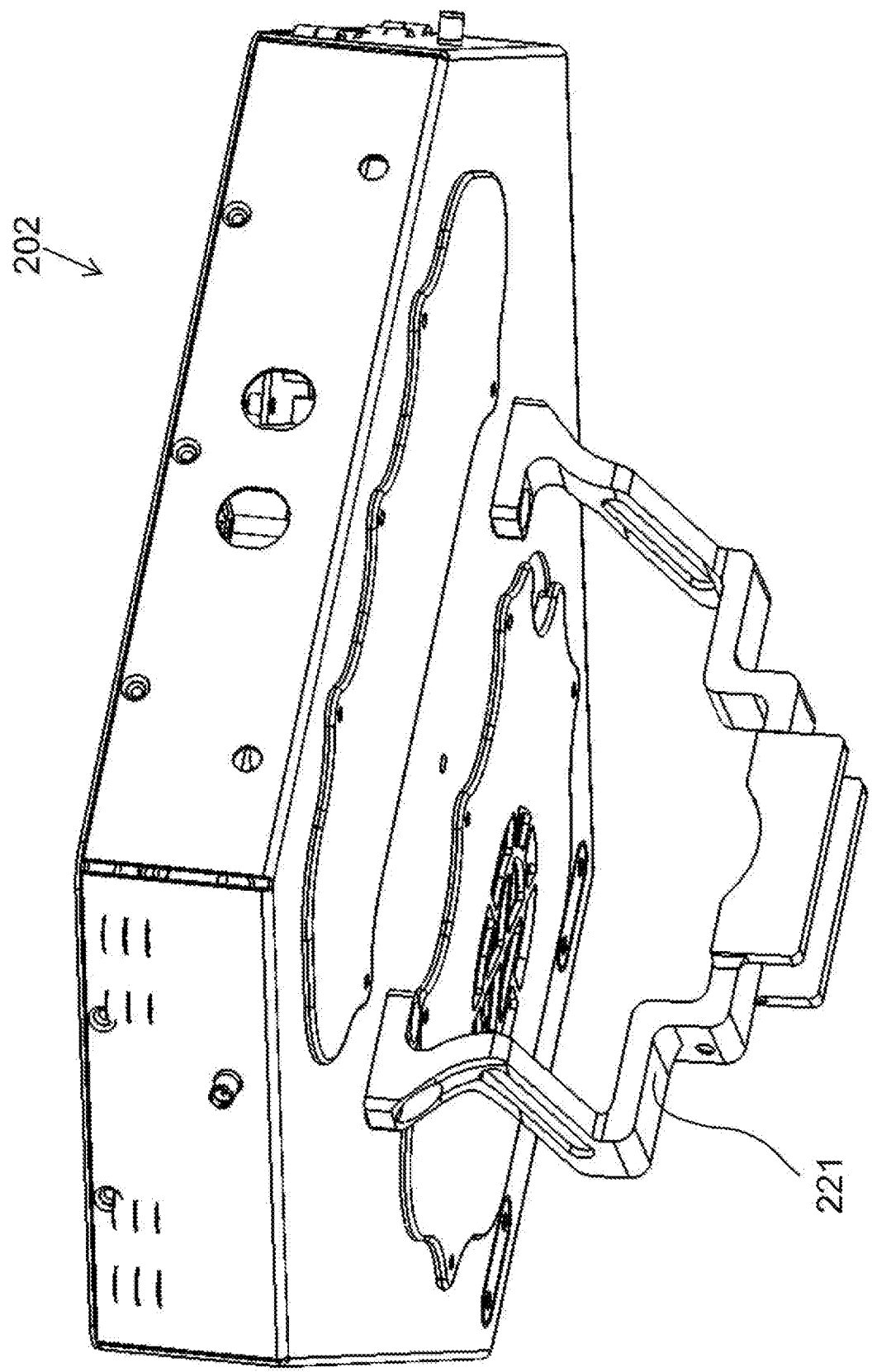

FIGS. 7A and 7B schematically illustrate different perspective views of displaceable mounting plate 202 according to an embodiment of the invention. The surface of plate 202 that faces base plate 201 comprises openings 216 through which arm sections 205 of actuators 203 pass and are coupled to second bearing assemblies 217 (not shown in FIG. 7A). The surface further comprises various mechanical and electrical connection points for connecting various instruments and equipment in between plates 201 and 202, such as imaging equipment (e.g. camera 218) for obtaining images from system 200's point of view, and other instruments that correlate with the stabilization of system 200. The other surface of plate 202 comprises mounting elements 221 for mounting, stabilizing and actuating various instruments on the stabilization system, such as firearms, optical devices, lighting devices or any other device.

It should be noted that the orientation of devices that are mounted on displaceable mounting plate 202 is determined by the orientation of mounting plate 202, since they are fixedly connected to each other, so that by changing the orientation of plate 202, the orientation of the attached device is changed similarly. For example, an instrument that is connected parallel to mounting plate 202 will be kept parallel to plate 202 at all times during the operation of the system. However, if a device is attached to an orientation-adjusting apparatus (e.g. a camera attached to a gimbal) that is connected by mounting elements 221 to plate 202, then the orientation of the device can be different from that of plate 202. However it is obvious that the orientation of the base of the orientation-adjusting apparatus is changed along with plate 202.

Figure 8A:
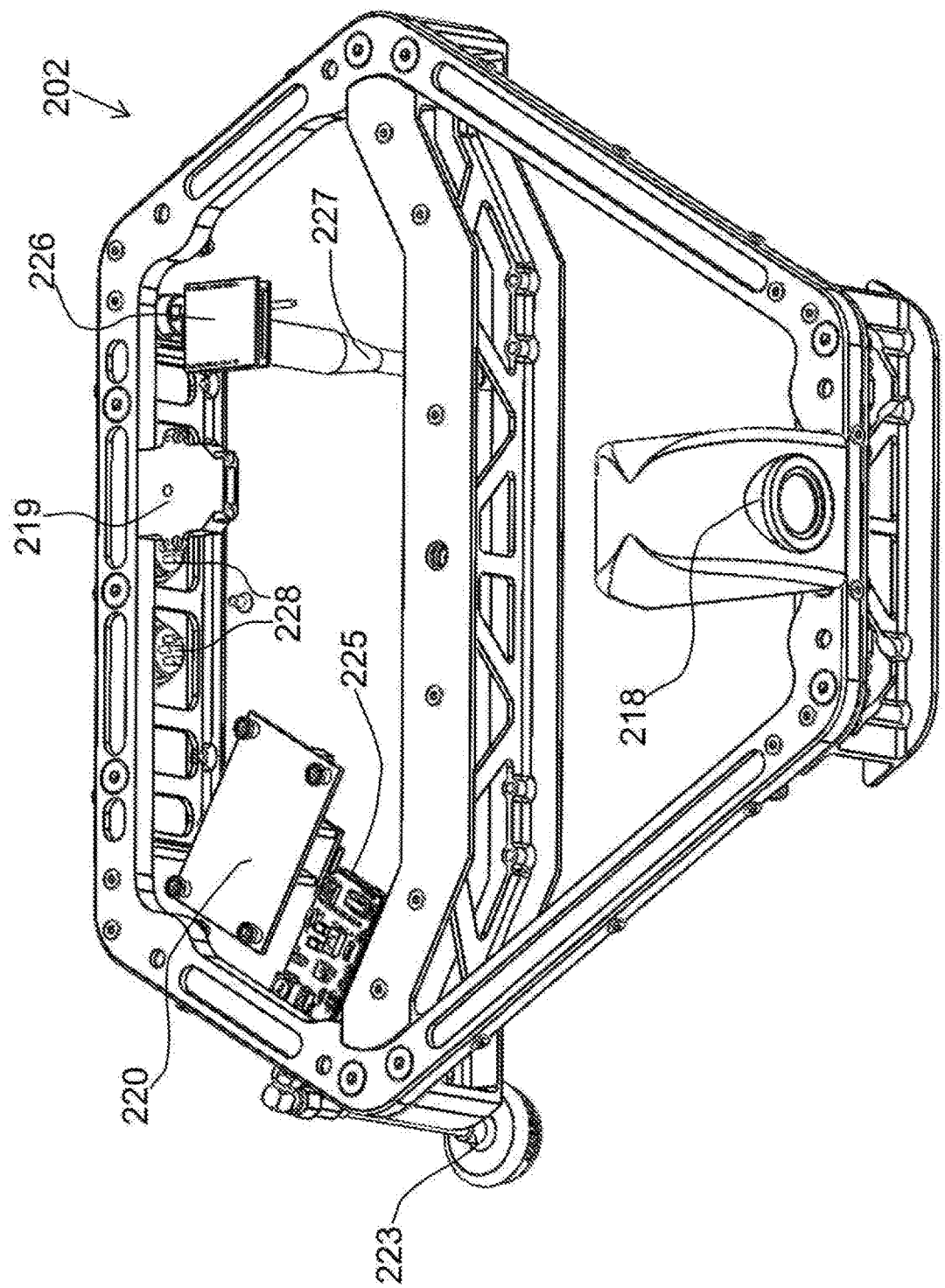
FIGS. 8 (A and B) schematically illustrate top and bottom views, respectively, of the displaceable mounting plate with its housing removed.
Figure 8B:
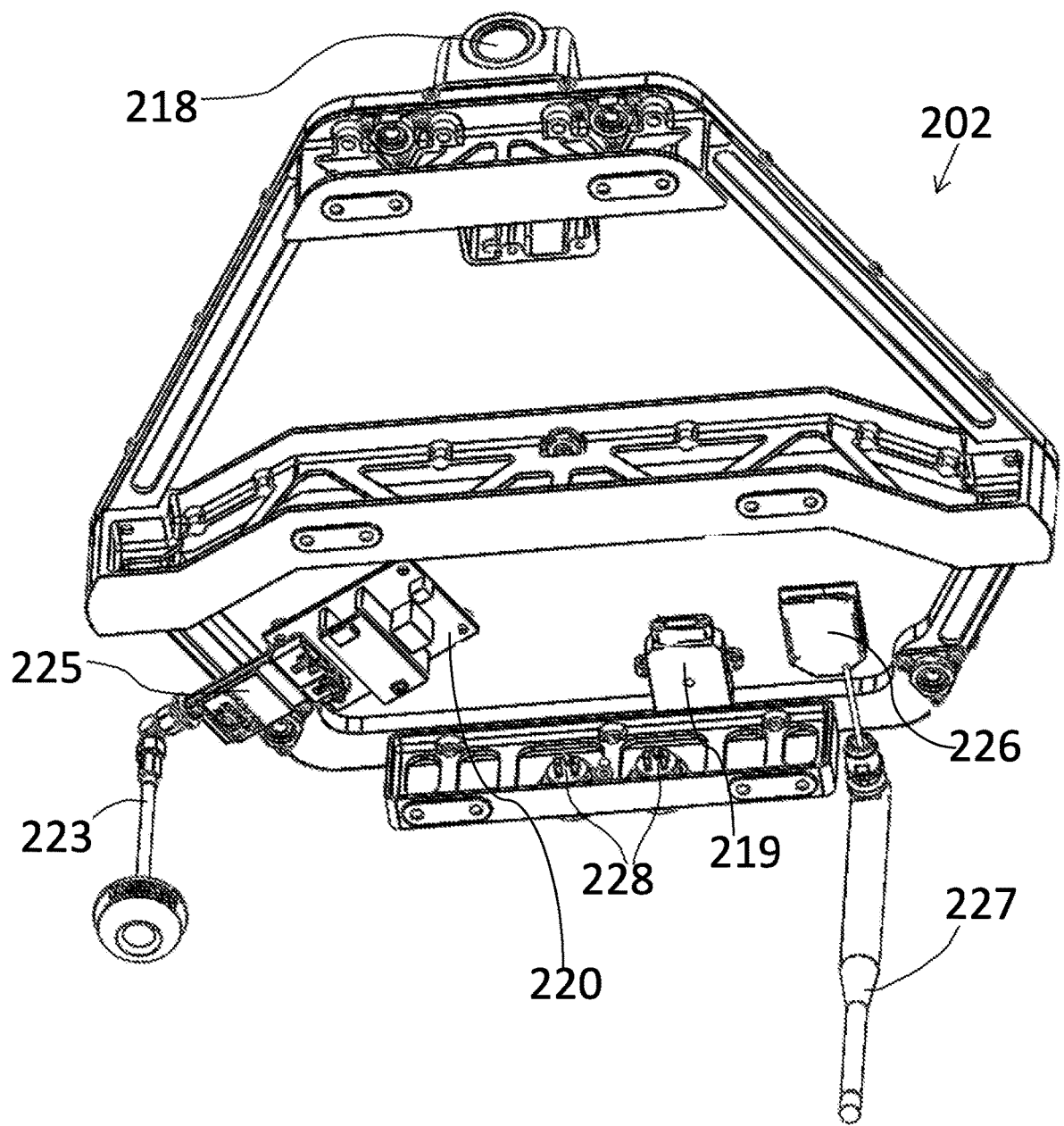

FIGS. 8A and 8B schematically illustrate top and bottom views, respectively, of displaceable mounting plate 202 with its housing removed. Plate 202 comprises one or more sensors (e.g. Inertial Measurement Unit (IMU) 219) for measuring orientation, acceleration, attitude and other parameters of the system. Measurements from the sensors are sent to a processing unit 220 for determining the next state of each arm, as will be further explained hereinafter. Processing unit 220 comprises an input module, a processing module and an output module.

Displaceable mounting plate 202 further comprises communications circuitry suitable to communicate with a control element, such as may be for example a hi-frequency transmitter 225, and a low-frequency transceiver 226, each provided with a dedicated antenna 223 and 227 respectively. Other embodiments may comprise, for instance only one transceiver and antenna.

One or more connectors 228 are provided for operating devices mounted on mounting plate 202. Wide field camera 218 is provided in this particular embodiment to deliver an image of the environment surrounding the system to a remote operator. Alternative vision apparatus can be provided instead of camera 218, or the camera can be omitted altogether. Plate 202 further comprises various electronic attachments (e.g. cables, voltage regulators etc.) that are not shown in the figures for the sake of brevity and clarity of the drawings.

Communication between displaceable mounting plate 202 and base plate 201 can be obtained either via a wireless or wired connection between a transmitter and receiver on each plate, as apparent to the skilled person (not shown in the figures).

According to an embodiment of the invention, displaceable mounting plate 202 further comprises a memory unit (not shown) comprising instructions related to the stabilization of system 200 and operation of a device connected thereto. Such instruction might include, for instance, an instruction to keep the mountable plate parallel to the ground at all times regardless of the orientation of the base plate. Other exemplary instructions might be to absorb or resist any motion or force exerted on the displaceable plate 202 from a device connected thereto, or to track a target aim via a camera feedback guidance using image-processing software.

Figure 9A:
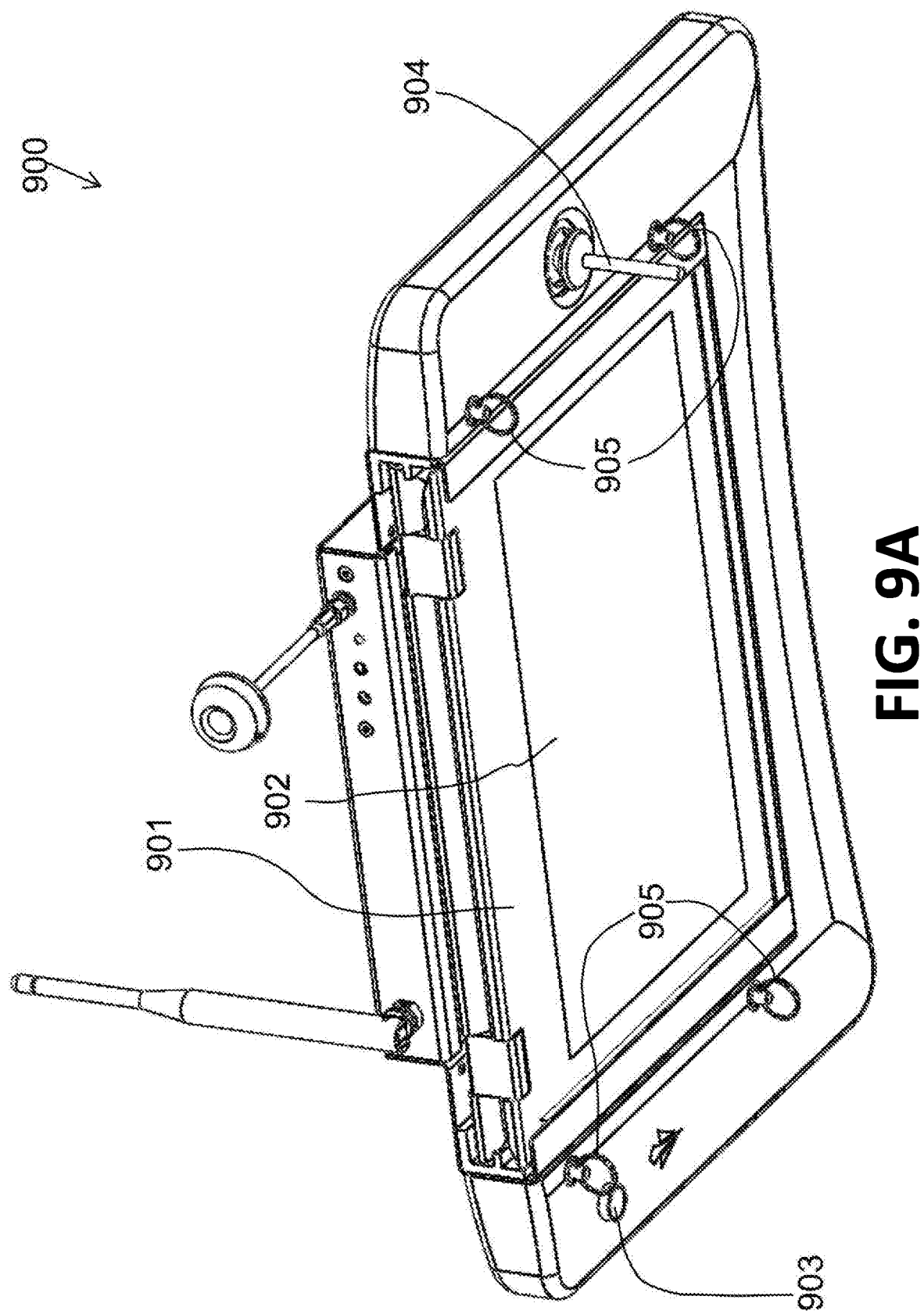
FIGS. 9 (A and B) schematically illustrate perspective views of a remote control station according to an embodiment.

According to an alternative embodiment of the invention, instructions related to the stabilization of system 200 and operation of a device connected thereto may be received from a control station at a location remote from system 200. FIG. 9A schematically illustrates a perspective view of a remote control station 900 according to an embodiment. Control station 900 comprises a mobile computational device (e.g. tablet computer 901 with a touchscreen 902). Operation button 903 is provided for a dedicated operation depending on the use of the system, e.g. a 'fire' button in case of a mounted firearm, or a 'record' button in case of a camera mounted on the system. Joystick 904 is used to adjust the orientation of the system, as will be explained in detail hereinafter. Carrying rings 905 are provided for attaching control station 900 to a harness.

Figure 9B:
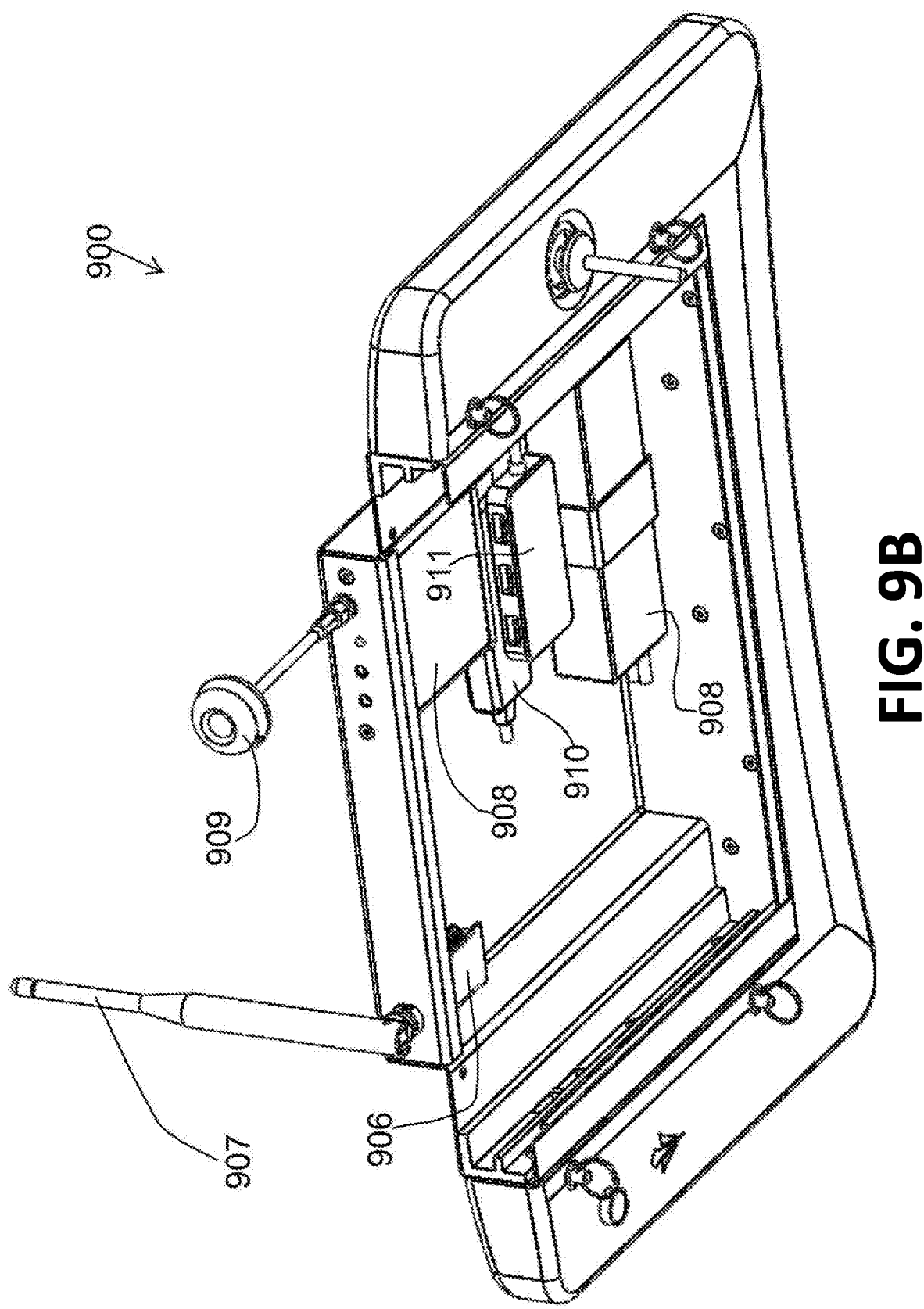

FIG. 9B schematically illustrates a perspective view of remote control station 900 according to an embodiment of the invention with the tablet computer (901 in FIG. 9A) removed. Communications circuitry suitable to communicate with a system 200 are provided, such as may be for example low frequency transceiver and antenna, 906 and 907 respectively, for sending and receiving data to and from low frequency transceiver and antenna 226 and 227 (shown in FIGS. 8A and 8B). High-frequency receiver and antenna, 908 and 909 respectively, are provided for receiving analog video data from camera 218 or from other imaging devices. A video-to-USB interface 910 is provided for transferring analog video data received from the system 200 to digital data in order to display the data on the touchscreen 902 of the tablet computer 901. USB splitter 911 is provided for enabling attachment of devices other than video-to-USB interface 910 to the tablet computer 901. A power supply (e.g. battery 912) is provided for powering the receiver 908 and other elements in control station 900 that require electric power supply.

According to an embodiment of the invention the operation of system 200 is performed in one of two modes:
  IMU Lock mode—one or more of the axes is locked (e.g. yaw). This mode contributes to stabilization of the system, for instance in dynamic environments, such as when connected to a sea vessel; and
  IMU Unlock mode—all of the axes are unlocked and can be adjusted. This mode allows higher precision, for instance in static environments, such as when connected to the ground.

In IMU Lock mode an initial (reference) orientation is measured from the IMU 219 (FIGS. 8A and 8B). When receiving an instruction to change the orientation, a software algorithm running on the processing unit 220 calculates the target orientation and the kinematic correction, i.e. the manipulations of the actuators that are needed in order to bring the initial (reference) orientation to the target orientation.

In IMU Unlock mode the kinematic angles of the system are adjusted directly when an instruction to adjust the orientation is received. The difference is measured between the target orientation and the current kinematic angle (relative to base plate 201), and the kinematic angle of the displaceable plate is changed in order to close the difference.

In both modes (i.e. IMU Lock and IMU Unlock) actuation of the control system joystick adds portions to angles. In IMU Lock portions of angles are added to the reference orientation, and in IMU Unlock portions of angles are added to the kinematic angle of the system.

Figure 10:
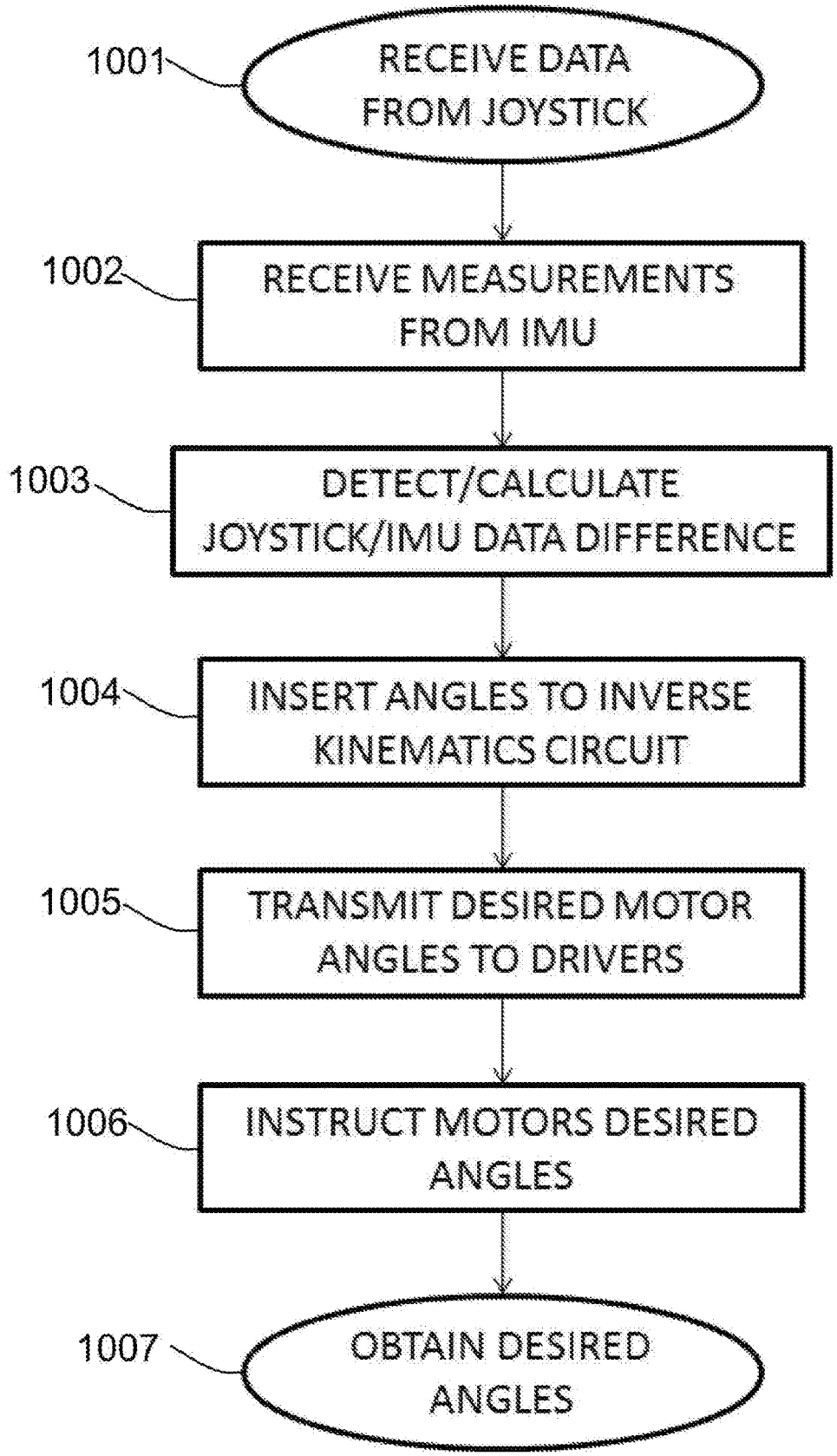
FIG. 10 shows a flowchart describing the process of stabilizing the system, according to an embodiment of the invention.

FIG. 10 is a flowchart schematically describing the process of adjusting motors 212 while stabilizing system 200, according to an embodiment of the invention. At the first stage 1001 data is received from a joystick at the processing unit. At the next stage 1002, processing unit 220 receives measurements from one or more sensors, sensing the orientation of the system (e.g. IMU 219). At the next stage 1003, a difference (error) between the current orientation state and data from the joystick and the IMU value is detected and calculated, and three desired IMU angles are calculated in terms of yaw ($\varphi$), pitch ($\theta$) and roll ($\Psi$) along a predetermined axis of rotation. At the next stage 1004, the values of $\varphi$, $\theta$ and $\Psi$ are inserted to a circuit capable of calculating the desired angle for each motor 212 using inverse kinematics. At the next stage 1005, the desired motor angles are transmitted from the processing unit 220 to the motor drivers 215. At the next stage 1006 motor drivers 215 instruct the motors 212 the angles that are to be obtained, and at stage 1007 each of motors 212 obtain the desired angles.

When a difference is detected between the current orientation and the desired orientation, e.g. in stage 1003, the angles of the motors are changed resulting in a change in orientation of displaceable plate 202. Therefore the motors are activated either due to change in the joystick data as result of an instruction from the operator, or due to a previous change in the sensor data as result of change in the angle of one or more motors.

Referring now again to FIG. 3, the actuation of an actuator 203 is described in detail. Although the actuation of only one actuator 203 is described, it is obvious that the description applies to each of the plurality of actuators 203 of system 200. The shoulder section 204 of actuator 203 further comprises a gear 224 that is coupled to gear 209 by belt 211, and is configured to rotate along axis 208 when belt 211 is rotated. Accordingly, rotation of gear 209 causes belt 211 to rotate, thereby rotating gear 224 and shoulder section 204 therewith. Rotation of shoulder section 204 is translated to planar motion of arm section 205 via mediating bearing assembly 206. The planar motion of arm section 204 is translated to a pulling/pushing planar force applied to bearing assembly 217 in displaceable mounting plate 202, thereby resulting in planar motion of the area on displaceable mounting plate 202 that actuator 203 is coupled to. It is noted that this description is provided for the embodiment of FIG. 3, which is a simple embodiment useful to illustrate the invention, but which should not be considered to limit it in any way. An actuator according to other embodiments that comprises, for instance, more than one belt or gear assemblies, would be actuated according to the same principle of operation mutatis mutandis.

In an exemplary case, assuming an initial configuration as illustrated in FIG. 3, clockwise rotation of gear 209 would cause clockwise rotation of shoulder section 204 along axle 208, resulting in application of a pulling force upon arm section 205, and consequently upon bearing assembly 217 and plate 202. Similarly, anticlockwise rotation of gear 209 would result in application of a pushing force upon arm section 205, and consequently upon bearing assembly 217 and plate 202.

Referring again to FIG. 13, base plate is connected to a turret 1303 for achieving redundancy and an enlarged yaw range. This configuration is suitable for achieving coarse changes in orientation of a mounted instrument, whereas fine changes may be achieved, as described above, by actuation of the actuators. The base section 1303a of turret 1303 is configured to be connected to various structures and the rotatable section 1303b (to which base plate 1301 is connected) is rotated by a motor inside the turret. Actuators 1304 comprise a shoulder section 1305 and an arm section 1306, and are actuated as described above in context of FIG. 3. In order to support displacement of an instrument connected to plate 1302, and in order to withstand the weight thereof and forces therefrom, massive gear is provided for transferring power from the motors (e.g. 212 in FIG. 6A) to actuators 1304. Displaceable plate 1302 comprises one or more (e.g. IMU 219), and is electrically connected to the base plate 1301.

Although embodiments of the invention have been described by way of illustration, it will be understood that the invention may be carried out with many variations, modifications, and adaptations, without exceeding the scope of the claims.

The invention claimed is:

1. A system for stabilizing a device, comprising:
a base plate including a plurality of motors;
a displaceable mounting plate including:
 a plurality of bearing assemblies;
 one or more sensors for measuring an orientation of the displaceable mounting plate; and
 mounting elements for mounting instruments on the displaceable mounting plate;
a plurality of actuators interconnected between the displaceable mounting plate and the base plate, wherein each of the plurality of actuators includes:
 a shoulder section pivotally coupled to one of the plurality of motors of the base plate;
 an arm section coupled to one of the plurality of bearing assemblies of the displaceable mounting plate; and
 a mediating bearing assembly disposed between the shoulder section and the arm section;
a processing unit adapted to receive readings from the one or more sensors, to determine a required state of each arm, and to instruct the plurality of motors to rotate; and
wherein each of the plurality of bearing assemblies and the mediating bearing assembly comprise:
 a first ring;
 a rod connected to an axial bearing and provided with an anchoring ball suitable to be accommodated in said first ring;
 a second ring connected at its two extremities to said first ring, having an inner shape such that allows it to rotate around said first ring; and
 connecting elements provided in said first ring and in said second ring, suitable to connect them to additional structures.

2. The system according to claim 1, comprising six actuators the shoulder sections of which are coupled to six motors and the arm sections of which are coupled to six bearing assemblies of the displaceable mounting plate.

3. The system according to claim 1, wherein the one or more sensors include one or more Inertial Measurement Units.

4. The system according to claim 1, wherein the base plate further comprises one or more sensors for measuring an orientation of the base plate.

5. The system according to claim 1, further comprising one or more belts and gear assemblies associated with each motor and shoulder section, wherein the one or more belts and gears transfer rotational movement from the motor to the shoulder section associated therewith.

6. The system according to claim 1, wherein the base plate and displaceable mounting plate are hexagonal.

7. The system according to claim 1, wherein an angular position of each shoulder section is monitored and controlled by a rotary encoder.

8. The system according to claim 1, further comprising imaging equipment adapted to obtain images from a point of view of the system.

9. The system according to claim 1, wherein the mounting elements are configured to mount the device selected from a firearm, an optical device or a lighting device.

10. The system according to claim 1, wherein the processing unit comprises an input module, an output module, and a processing module.

11. The system according to claim 1, further comprising communication circuitry suitable to communicate between the displaceable mounting plate and the base plate either wirelessly or by wired connection.

12. A system for remotely stabilizing a device, comprising:
a remote control station comprising:
 a mobile computational device with a touchscreen;
 a joystick;
 a power supply;
 one or more operation buttons; and
 communication elements configured to communicate with remote systems; and a system for stabilizing a device including:
  a base plate including a plurality of motors;
  a displaceable mounting plate including:
    a plurality of bearing assemblies;
    one or more sensors for measuring an orientation of the displaceable mounting plate; and
    mounting elements for mounting instruments on the displaceable mounting plate;
  a plurality of actuators interconnected between the displaceable mounting plate and the base plate, wherein each of the plurality of actuators includes:
    a shoulder section pivotally coupled to one of the plurality of motors of the base plate;
    an arm section coupled to one of the plurality of bearing assemblies of the displaceable mounting plate;
    a mediating bearing assembly disposed between the shoulder section and the arm section; and
  a processing unit adapted to receive readings from the one or more sensors, to determine a required state of each arm, and to instruct one or more of the plurality of motors to rotate, wherein the system for stabilizing the device further comprises communication elements configured to communicate with the remote control station; and
  wherein each of the plurality of bearing assemblies and the mediating bearing assembly comprise:
    a first ring;
    a rod connected to an axial bearing and provided with an anchoring ball suitable to be accommodated in said first ring;
    a second ring connected at its two extremities to said first ring, having an inner shape such that allows it to rotate around said first ring; and
    connecting elements provided in said first ring and in said second ring, suitable to connect them to additional structures.

13. The system according to claim 12, wherein the communication elements of the remote control station comprise a high-frequency receiver and antenna, a low-frequency transceiver and antenna, and an interface for transferring data between said receiver and transceiver and said mobile computational device.

14. A method for stabilizing a device comprising:
  connecting the device to a system for stabilizing the device, wherein the system includes:
    a base plate including a plurality of motors;
    a displaceable mounting plate including:
      a plurality of bearing assemblies;
      one or more sensors for measuring an orientation of the displaceable mounting plate; and
      mounting elements for mounting instruments on the displaceable mounting plate;
    a plurality of actuators interconnected between the displaceable mounting plate and the base plate, wherein each of the plurality of actuators includes:
      a shoulder section pivotally coupled to one of the plurality of motors of the base plate;
      an arm section coupled to one of the plurality of bearing assemblies of the displaceable mounting plate;
      a mediating bearing assembly disposed between the shoulder section and the arm section; and
    a processing unit adapted to receive readings from the one or more sensors, to determine a required state of each arm, and to instruct one or more of the plurality of motors to rotate; and
    wherein each of the plurality of bearing assemblies and the mediating bearing assembly comprise:
      a first ring;
      a rod connected to an axial bearing and provided with an anchoring ball suitable to be accommodated in said first ring;
      a second ring connected at its two extremities to said first ring, having an inner shape such that allows it to rotate around said first ring; and
      connecting elements provided in said first ring and in said second ring, suitable to connect them to additional structures;
  determining a required orientation of the device;
  sensing the current orientation of the device; and
  comparing the orientation of the device to the required orientation.

15. The method according to claim 14, wherein the required orientation of the device is determined according to instructions stored in a local memory unit within the system.

16. The method according to claim 14, wherein the required orientation of the device is determined from instructions received at the system from a remote control station.

17. The method according to claim 14, wherein comparison of the orientation of the device to the required orientation comprises:
  detecting, by the processing unit, a difference between a current orientation of the device and the required orientation;
  calculating, by the processing unit, a value of the difference and a desired angle for each of the motors;
  instructing the motors to obtain the desired angles for each of the plurality of motors; and
  obtaining, by the motors, the desired angles for each of the plurality of motors.

18. The method according to claim 17 wherein obtaining the desired angles by the motors actuates the actuators, such that when the shoulder section of an actuator rotates along with the motor to which it is coupled, the rotation is translated via the mediating bearing assembly of the actuator to planar motion of the arm section of the actuator, and the planar motion is translated to a pulling/pushing planar force applied to the bearing assembly to which the arm section of the actuator is coupled.

* * * * *